(12) United States Patent
Juliato et al.

(10) Patent No.: US 12,513,158 B2
(45) Date of Patent: Dec. 30, 2025

(54) SECURITY-GUIDED ADJUSTMENT OF TIME-SYNC FREQUENCY IN TIME SYNCHRONIZED NETWORKING

(71) Applicant: Intel Corporation, Santa Clara, CA (US)

(72) Inventors: Marcio Juliato, Portland, OR (US); Shabbir Ahmed, Beaverton, OR (US); Christopher Gutierrez, Hillsboro, OR (US); Vuk Lesi, Cornelius, OR (US); Manoj Sastry, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 464 days.

(21) Appl. No.: 17/990,091

(22) Filed: Nov. 18, 2022

(65) Prior Publication Data

US 2024/0171593 A1    May 23, 2024

(51) Int. Cl.
*H04L 9/40*    (2022.01)
*H04J 3/06*    (2006.01)

(52) U.S. Cl.
CPC ........ *H04L 63/1416* (2013.01); *H04J 3/0658* (2013.01); *H04L 63/1466* (2013.01)

(58) Field of Classification Search
CPC .............. H04L 63/1416; H04L 63/1466; H04J 3/0658; H04J 3/0667; H04J 3/14
See application file for complete search history.

(56) References Cited

U.S. PATENT DOCUMENTS

| | | | | |
|---|---|---|---|---|
| 11,044,260 | B2* | 6/2021 | Shin | H04W 12/61 |
| 11,165,794 | B2* | 11/2021 | Zeh | H04L 9/085 |
| 2020/0204395 | A1* | 6/2020 | Takahashi | H04L 63/1425 |
| 2021/0232686 | A1* | 7/2021 | Tatedoko | G06F 21/554 |
| 2022/0224501 | A1* | 7/2022 | Lesi | H04J 3/06 |
| 2023/0019699 | A1* | 1/2023 | Zinner | H04L 12/40 |
| 2024/0143020 | A1* | 5/2024 | Lesi | G06F 1/10 |
| 2024/0223585 | A1* | 7/2024 | Gutierrez | H04J 3/0667 |
| 2025/0220047 | A1* | 7/2025 | Juliato | H04L 63/20 |

FOREIGN PATENT DOCUMENTS

CN    119946793 A  *  5/2025 ............ H04W 56/00

* cited by examiner

*Primary Examiner* — Christopher A Revak
(74) *Attorney, Agent, or Firm* — KDW FIRM PLLC

(57) ABSTRACT

Techniques include an apparatus to retrieve a first parameter for the IDS to monitor a device for a time-synchronized network. The first parameter may represent a number of messages the IDS needs to analyze in order to detect a security attack. The messages may comprise time information to synchronize a clock for a device to a network time for a time-synchronized network. The processor circuitry may retrieve a second parameter for a time sensitive application. The second parameter may represent a defined amount of time error tolerated by the time sensitive application, and determine a third parameter for the IDS based on the first and second parameters. The third parameter may represent a defined frequency to receive a number of messages with time information in order to detect the security attack on the device within a defined time interval. Other embodiments are described and claimed.

20 Claims, 22 Drawing Sheets

SECURITY-GUIDED ADJUSTMENT OF TIME-SYNC FREQUENCY IN TIME SYNCHRONIZED NETWORKING

BACKGROUND

Many computing systems require real-time safety critical features. For example, many autonomous systems, industrial systems, etc., require such systems to have real-time safety-critical features. This often necessitates that timekeeping performance within the system has higher levels of security relative to other aspects of the system. For example, factories employ synchronized robots to accomplish coordinated tasks, often in the presence of human beings. In an additional example, robots utilize coordination to perform surgeries on humans. As yet another example, self-driving vehicles require synchronization of networked sensing elements to build a precise perception of the environment around the vehicle, including other vehicles, objects, hazards, and persons. Tools relied on to achieve the necessary time performance, synchronization, and bounded latency communication for such time sensitive systems to perform as needed is often referred to as time-synchronized networking.

In general, a time-synchronized network defines a set of standards (and amendments) with the aim to enable time synchronization and deterministic data delivery in converged networks where time-critical (TC) traffic coexists with other types of traffic. Thus, there is a need to provide security for network devices to mitigate the risks associated with disruption in time-synchronized operations from attacks on the timing of the network.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
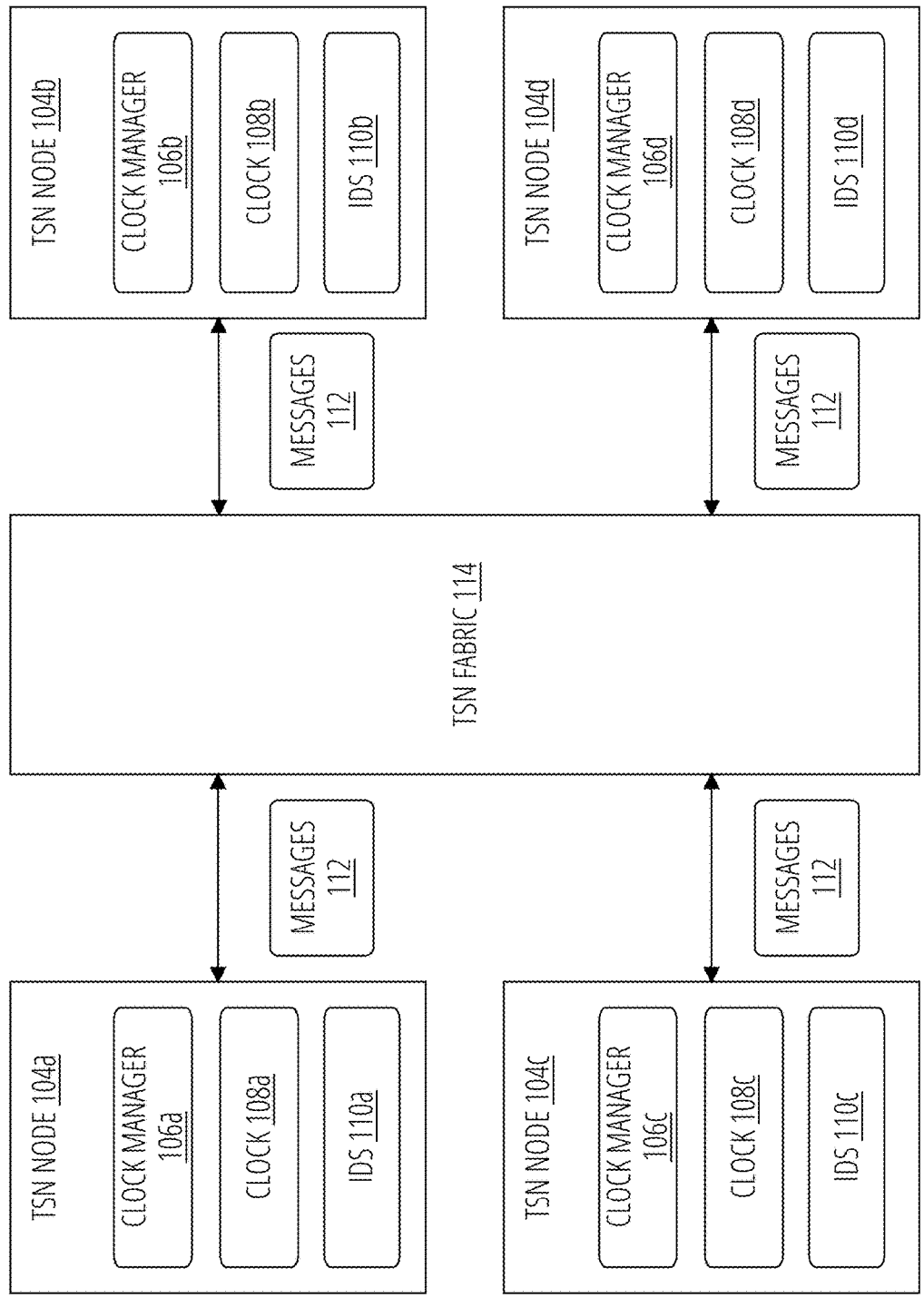
FIG. 1A illustrates an aspect of a time-synchronized network (TSN) 102 in accordance with one embodiment.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

The present disclosure is generally directed to time management and recovery techniques for systems operating on strict time requirements, such as systems based on time-synchronized networks (TSNs). As noted, TSN defines a set of standards (and amendments) with the aim to enable time synchronization and deterministic data delivery in converged networks where time sensitive traffic coexists with other types of traffic. Various standards have been developed to address time-sensitive communications. By way of example and not limitation, some standards for enabling time-synchronized communications include those promulgated by the Institute of Electrical and Electronics Engineers (IEEE). For example, IEEE 1588, IEEE 802.1AS and IEEE 802.1Qbv provide systems and methods for synchronizing device clocks. In one example, IEEE 1588 defines a precision time protocol (PTP) for time synchronization across a network. In another example, IEEE 802.1AS defines a time-sensitive networking protocol referred to as a generic PTP (gPTP) for time synchronization across a network, where time sensitive devices (e.g., clock followers) synchronize to a leader clock (e.g., clock leader). In yet another example, IEEE 802.1Qbv defines time-sensitive networking profiles for industrial automation. Other examples include a network time protocol (NTP) which is a networking protocol for clock synchronization between computer systems over packet-switched, variable-latency data networks, network time security which is a secure version of NTP, and other time-synchronized network protocols. Embodiments are not limited to these examples.

Time synchronization in a TSN requires tight software-hardware interplay. A device (or node) in a TSN may implement a clock manager as a software component and a hardware clock as a hardware component. The clock manager adjusts timing for the hardware clock to ensure synchronization with a common network time for the TSN. In one embodiment, for example, a precision time protocol (PTP) hardware clock (PHC) is periodically adjusted by a PTP for Linux (PTP4L) software module to account for time offset between a clock leader and a clock follower in PTP-synchronized nodes. A corrupted software component can misconfigure or mis-control hardware, however, leading to incorrect timekeeping. Attackers located within a TSN-capable platform can tamper with the operation of the clock manager software, such as by tampering with offset sensing, clock adjustment computation, or frequency adjustment actuation. Consequently, system and applications depending on TSN capabilities will consume incorrect time. Similarly, attackers located external to a TSN-capable platform can tamper with messages carrying time information to synchronize the hardware clock. The incorrect timekeeping may further influence any applications using the time synchronization resource. Accordingly, early detection of corrupted messages and/or software components, such as a clock manager for a TSN node, is critical in a TSN.

In addition to attacks made on a particular TSN node and a PTP4L, other attack vectors include those types of attacks originating from other devices in a network. Examples include malicious switches and/or relays tampering with time-related messages, or external attackers injecting messages into the network, which ends up impacting the time of the nodes downstream.

One conventional solution to address this problem is to implement an intrusion detection system (IDS) to monitor devices within a TSN to identify any abnormal behavior. An IDS implements software, firmware or hardware to support one or more specialized security functions, such as detecting malicious behavior caused by an attacker. The IDS may be implemented on a TSN node or separate from a TSN node. The IDS receives as input messages containing time information for synchronizing a clock of a TSN node with a network time for the TSN. The IDS analyzes the messages to detect anomalies, such as slight modifications to the time information to cause a TSN node to update an internal clock with a wrong network time. Incorrect time synchronization can cause disruptions in time sensitive applications executing on the TSN node, such as causing collisions between cooperative robotic arms or delaying braking in an autonomous vehicle. When the IDS detects abnormalities in messages carrying time information, the IDS generates an alert and takes action to isolate any affected TSN applications and/or TSN nodes from a compromised TSN node.

A problem occurs, however, whenever an IDS fails to detect a security attack in a timely manner. It takes a certain amount of time for an IDS to detect an attack. An attacker may make small deviations in time information carried by messages that causes very slow clock drift in a TSN node. The deviations may be small enough to escape immediate detection by the IDS. Furthermore, the IDS itself may cause a certain amount of time delay as it intercepts messages, analyzes the messages for anomalies, and forwards the messages to the TSN node. Meanwhile, the accumulated time error is slowly building within a clock of the TSN node, which is continuously consumed by the time sensitive application. A condition may occur where the accumulated time error exceeds a tolerable threshold for the time sensitive application before detection by the IDS. As a result, the time sensitive application may be disrupted or fail before the IDS can take any corrective actions.

In an attempt to solve these and other problems, embodiments implement techniques to manage a frequency by which messages are communicated within a TSN. An IDS typically needs to receive and analyze a certain number of messages before detecting a security attack with a high enough level of confidence to generate an alert. By accelerating a frequency or rate messages carrying time information are communicated within a TSN, the IDS may detect a security attack in a reduced amount of time. Towards this end, embodiments implement techniques to modify a message frequency, either statically at design time or dynamically at run-time of a TSN, to a rate that allows an IDS to detect a security attack before a time sensitive application is affected.

In one embodiment, for example, a computing apparatus to implement an IDS includes a processor circuitry. The computing apparatus also includes memory storing instructions that, when executed by the processor circuitry, cause the processor circuitry to retrieve a first parameter for the IDS to monitor a device for a time-synchronized network. The first parameter may represent a number of messages the IDS needs to analyze in order to detect a security attack on the device. The messages may comprise time information to synchronize a clock for the device to a network time for the time-synchronized network. The processor circuitry may retrieve a second parameter for a time sensitive application receiving time information from the synchronized clock of the device. The second parameter may represent a defined amount of time error tolerated by the time sensitive application, and determine a third parameter for the IDS based on the first and second parameters. The third parameter may represent a defined frequency to receive a number of messages with time information in order to detect the security attack on the device within a defined time interval. The third parameter may be a static parameter or a dynamic parameter. The static parameter can be used to design or initialize message frequencies for one or more TSN nodes in a TSN before run-time operations of the TSN nodes in the TSN. The dynamic parameter can be used to dynamically modify message frequencies during run-time operations of TSN nodes in a TSN. In either case, an IDS may detect a security attack faster than conventional techniques, thereby allowing the IDS to generate alerts and take corrective actions before operations for a time sensitive application are disrupted or completely fail. Other embodiments are described and claimed.

FIG. 1A depicts a time-synchronized network (TSN) 102 implemented according to a TSN standard (e.g., IEEE 1588, IEEE 802.1AS, IEEE 802.1Qbv, IEEE 802.15.4, or the like). As depicted, TSN 102 includes various TSN nodes 104, such as TSN nodes 104a-d. The TSN nodes 104 may be implemented as different types of nodes for a TSN, such as an origination node, relay nodes, switch nodes or end node. The TSN nodes 104a-d are communicatively coupled via a TSN fabric 114. The TSN fabric 114 can connect the TSN nodes 104a-d using various types of network topology (e.g., mesh, star, etc.) and various types of communications channels (e.g., wired, wireless, fiber optic, buses, etc.). It is noted that the number of nodes in the TSN 102 is selected for purposes of clarity and not limitation. In practice, the TSN 102 can include any number and combination of nodes (e.g., origination nodes, switches, relay nodes, end devices, etc.).

The TSN nodes 104 can communicate with each other via the TSN fabric 114. For instance, the TSN nodes 104 can send messages 112 to each other over one or more communication channels provided by the TSN fabric 114. The messages 112 can include control information and payload information. One type of control information may include time information. The time information may comprise synchronization messages, time update messages or time follow-up messages (among other time protocol messages) for a time protocol used by the TSN 102.

Each TSN node 104 in the TSN 102 includes various hardware and/or software components. As depicted in FIG. 1A, a TSN 104 includes a clock manager 106, a clock 108 and an intrusion detection system (IDS) 110 (referred to herein as an "IDS" or "detector"). For instance, the TSN node 104a includes a clock manager 106a, a clock 108a and an IDS 110a. The TSN node 104b includes a clock manager 106b, a clock 108b and an IDS 110b. The TSN nodes 104c, 104d are similarly configured. It may be appreciated that these are just a few components for a TSN 104, and the TSN 104 can include other standard components for an electronic device, such as network interfaces, radio transceivers, input/output (I/O) components, memory units, processing circuits, controllers, sensors, actuators, mechanical parts, application software, operating system software, TSN-enabled platforms, and so forth.

In various embodiments, the clock manager 106 is implemented as a software component, and the clock 108 is implemented as a hardware component (e.g., "hardware clock" or "clock circuitry"). The IDS 110 can be implemented as a software component, a hardware component, or a combination of both software and hardware components. Embodiments are not limited in this context.

The clock manager 106 generally manages a time (e.g., clock signals) generated by the clock 108. A key component in clock synchronization mechanisms is the clock manager software. In a time-synchronized network such as the TSN 102, this component tightly interacts with network hardware (e.g., Ethernet/Wi-Fi) to obtain Precision Time Protocol (PTP) message timestamps, as well as with PTP clock hardware to implement suitable phase/frequency corrections in order to synchronize with a clock leader. The clock manager 106 typically implements a "clock servo." A clock servo is a control algorithm that periodically takes as input some measurement (or estimate) of clock offset to a reference clock, and computes as output either time (e.g., phase) or frequency adjustment to compensate for the given offset.

The clock 108 is generally a hardware clock that implements clock circuitry to generate signals for digital electronics implemented by the TSN node 104. In electronics and especially synchronous digital circuits, a clock signal oscillates between a high and a low state and is used to coordinate actions of the digital circuits. A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle. The clock 108 generates clock signals under control of the clock manager 106. The clock 108 can be implemented using any suitable hardware having a timing accuracy required by a given device or network. In the TSN 102, the clock 108 can be implemented as a PHC, although other hardware clocks can be implemented as well. Embodiments are not limited in this context.

In normal operation, a network interface (not shown) for a TSN node 104 can receive messages 112 that include time information representative of a network time for the TSN 102. The clock manager 106 can receive the time information from the network interface, analyze the time information, and determine whether time adjustments are needed for the clock 108. When time adjustments are needed, the clock manager 106 generates control information and sends the control information to the clock 108. The clock 108 receives the clock manager control information, and adjusts a parameter for the clock 108, such as a phase or frequency for the clock signals generated by the clock 108.

The IDS 110 generally monitors various parts of the time sensitive network 102 to detect abnormal or malicious behavior of one or more devices in a time sensitive network 102. In general, the IDS 110 is a device or software application that monitors a device, network or systems for malicious activity or policy violations. As previously discussed, an attacker may ultimately impact nodes from a number of different attack vectors. An attack may come from the network, with attackers controlling switches and impacting messages passing by. An attack may come from external attackers injecting messages into the network. An attack can be on an individual node or collection of nodes. The role of the IDS 110 is to collect features of the system and make decisions that indicate the different types of attacks.

The IDS 110 may be specifically tuned to detect a timing attack, such as a desynchronization attack, or other TSN specific attack vector. Any intrusion activity or violation is typically reported either to other devices in the same network, an administrator, and/or collected centrally using a security information and event management (SIEM) system. A SIEM system combines outputs from multiple sources and uses alarm filtering techniques to distinguish malicious activity from false alarms. In addition to the TSN node 104, the IDS 110 may be implemented for other devices in the TSN, such as relay nodes 104a-104c, to provide a more comprehensive security solution to an attacker.

The IDS 110 can operate in an on-line or off-line mode. When operating in an on-line mode, the IDS 110 examines network traffic in real time. It performs an analysis of passing traffic on the entire subnet, and matches the traffic that is passed on the subnets to the library of known attacks. For instance, it analyses the message 310 (e.g., a TSN timing message) and applies some rules, to decide if it is an attack or not. Off-line mode typically deals with stored data and passes it through some processes to decide if it is an attack or not. For the offline case, a message may be replicated for offline analysis. It may be replicated in hardware without incurring a memory copy. However, a software solution may copy the message from the queue for later analysis. In either mode, once an attack is identified, or abnormal behavior is sensed, an alert can be sent to a SIEM, a network administrator, or a software application to automatically implement security protocols, such as dropping the message 112, isolating an infected device guarded by the IDS 110, and/or re-configuring one or more network paths for impacted devices in the TSN network.

The IDS 110 can utilize any number of different detection methods to detect an attack. For instance, the IDS 110 may implement a signature-based method, a statistical anomaly-based method, a stateful protocol analysis method, machine-learning based, or some combination of all four methods. A signature-based IDS monitors packets in the network and compares with pre-configured and pre-determined attack patterns known as signatures. A statistical anomaly-based or machine-learning based IDS monitors network traffic and compares it against an established baseline. The baseline will identify what is "normal" for that network, such as what sort of bandwidth is generally used and what protocols are used. A stateful protocol analysis IDS identifies deviations of protocol states by comparing observed events with defined profiles of generally accepted definitions of benign activity. It will be appreciated that these detection methods are by way of example and not limitation. Other embodiments may use different detection methods as well. The embodiments are not limited in this respect.

Figure 1B:
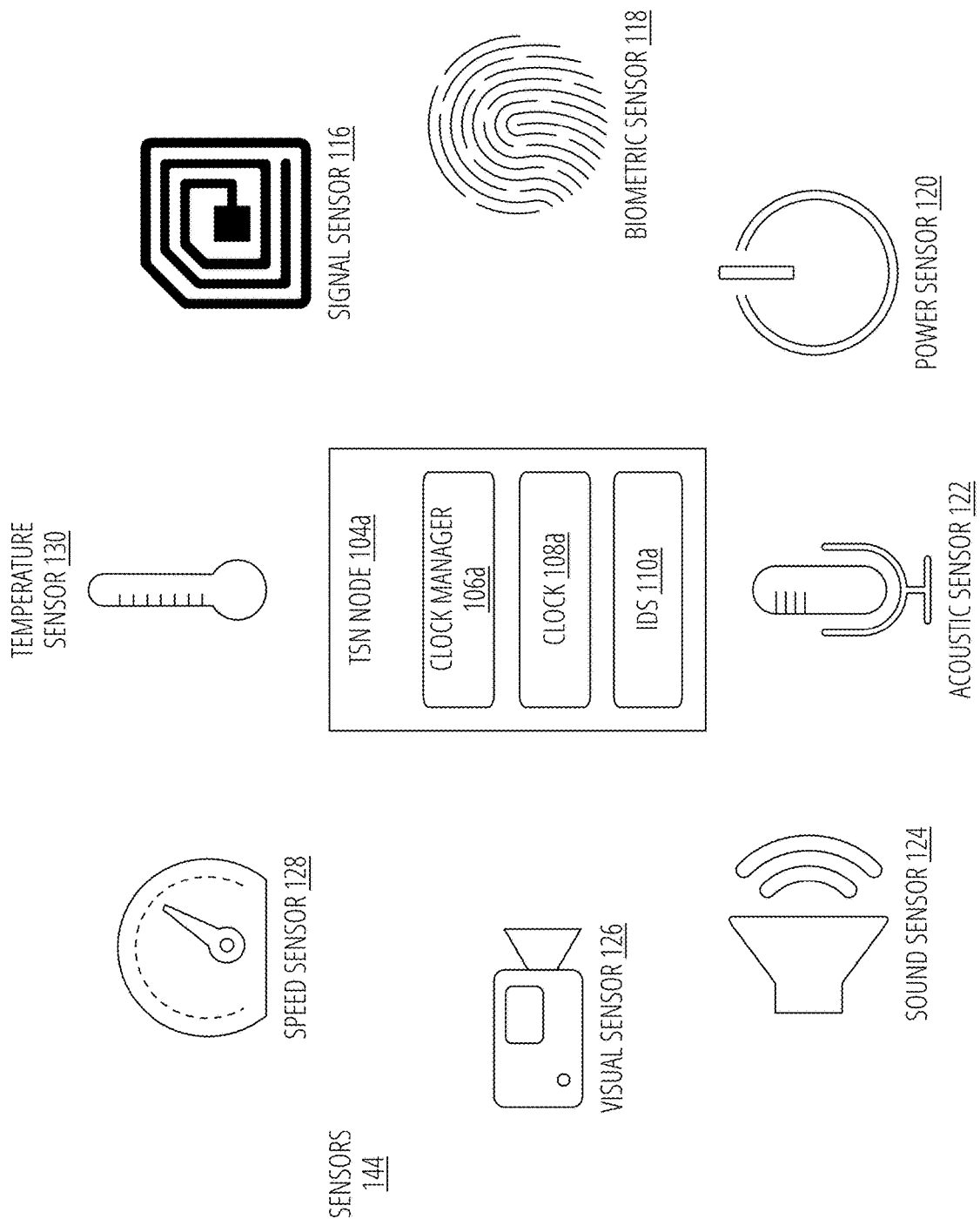
FIG. 1B illustrates an aspect of a TSN 102 for sensors in accordance with one embodiment.

FIG. 1B illustrates an example of a TSN node 104a of the TSN 102 designed to control one or more sensors 144. As depicted in FIG. 1B, the TSN node 104 manages various types of sensors 144, such as a signal sensor 116, a biometric sensor 118, a power sensor 120, an acoustic sensor 122, a sound sensor 124, a visual sensor 126, a speed sensor 128, a temperature sensor 130, and so forth. The TSN node 104a may be suitable for implementing the IDS 110.

Figure 1C:
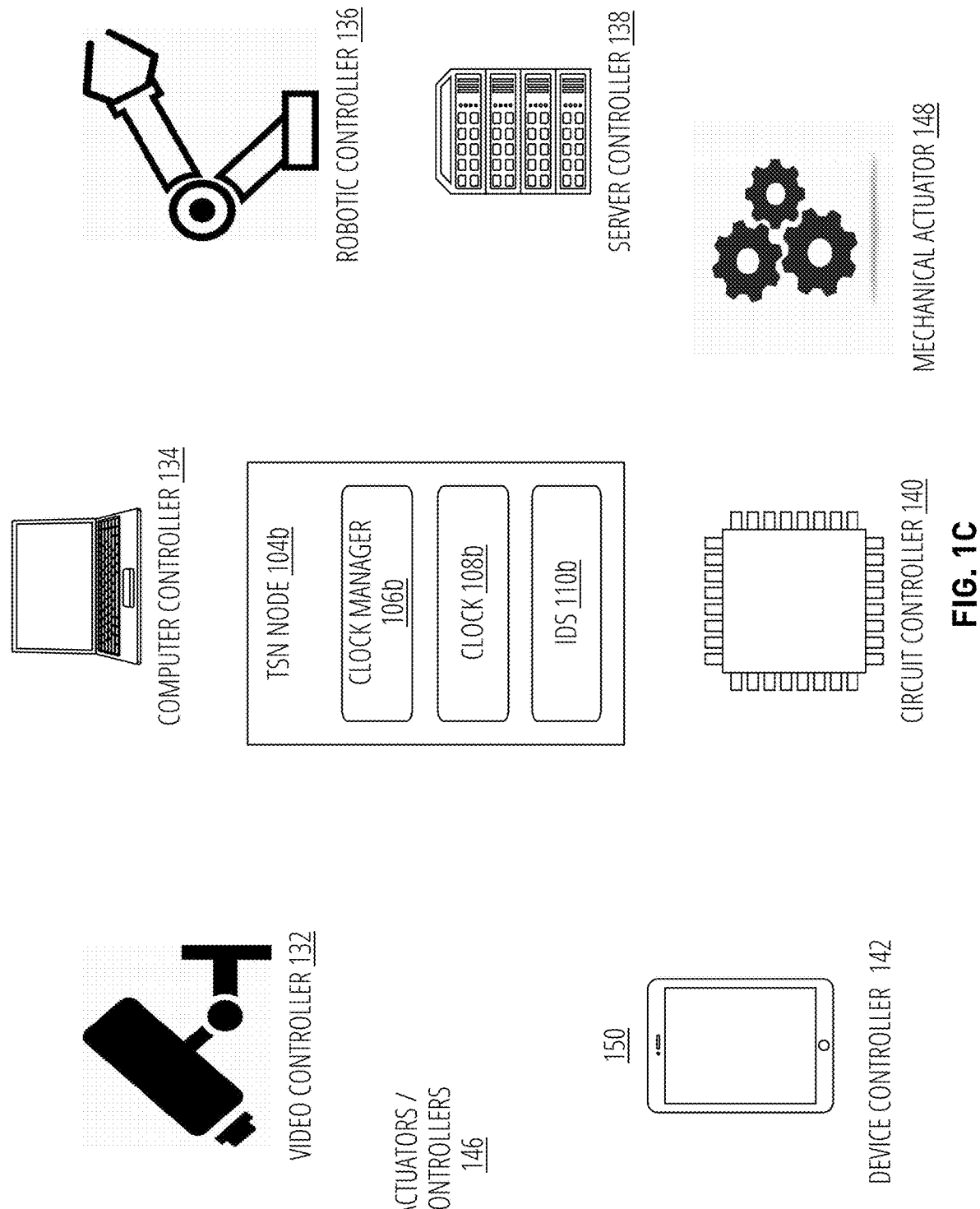
FIG. 1C illustrates an aspect of a TSN 102 for actuators in accordance with one embodiment.

FIG. 1C illustrates an example of a TSN node 104b of the TSN 102 designed to control one or more actuators and/or host controllers 146. As depicted in FIG. 1C, the TSN node 104b manages various types of actuators/controllers 146, such as a robotic controller 136, a server controller 138, a mechanical actuator 148, a circuit controller 140, a device controller 142, a video controller 132, a computer controller 134, and so forth. As with FIG. 1B, the TSN node 104b shown in FIG. 1C may be suitable for implementing the IDS 110, as discussed in more detail herein.

In time-synchronized networks, such as the TSN 102 depicted in FIGS. 1A-1C, it becomes important for all the TSN nodes 104 to synchronize to a common or shared network time for the TSN 102. For instance, the TSN nodes 104 may operate in accordance with IEEE 802.1AS which implements a hierarchical network to synchronize one or more clock followers (CFs) to a clock leader (CL) through relays or switch nodes. Synchronization is performed through communication of time messages, such as the messages 112. The time messages may comprise, for example, time synchronization messages, time update messages and/or time follow-up messages for a PTP.

In some cases, an attacker may simply attempt to disrupt timing of a single TSN node 104 handling critical functions, such as disrupting one or both of the TSN node 104a managing the sensors 144 and/or the TSN node 104b managing the actuators/controllers 146. Rather than attempting to disrupt timing for the entire TSN 102, the attacker may attempt to attack timing of a single TSN node 104 to disrupt key operations for the TSN node 104, such as an electronic control unit (ECU) to control speed sensing for a vehicle or a controller for a robotic arm in a factory.

In other cases, an attacker may attempt to disrupt timing across the entire TSN 102. To attack or disrupt the TSN 102, an attacker may attempt a timing attack or desynchronization attack to compromise timing for one or more of the TSN nodes 104 in the TSN 102. Assume the TSN node 104c operates as a clock leader (CL) in the TSN 102, and the TSN node 104d operates as a clock follower (CF) in the TSN 102. If an attacker located on a network device (e.g., switch or relay) modifies a critical attribute on a specific port, then all downstream nodes from that network device will suffer a desynchronization event. In this example, if the attacker successfully compromises the TSN node 104c, then the TSN node 104d is vulnerable to a timing attack in the form of receiving messages 112 from the TSN node 104c with erroneous time information. Therefore, it becomes important to detect and localize an attack as quickly as possible.

In all cases, a time-synchronized network such as the TSN 102 is vulnerable to a timing attack or a desynchronization attack. If a single network node is compromised, it may cause a cascade failure across the entire TSN 102. An example of such an attack is further described with reference to FIGS. 2A, 2B, 3A and 3B.

Figure 2A:
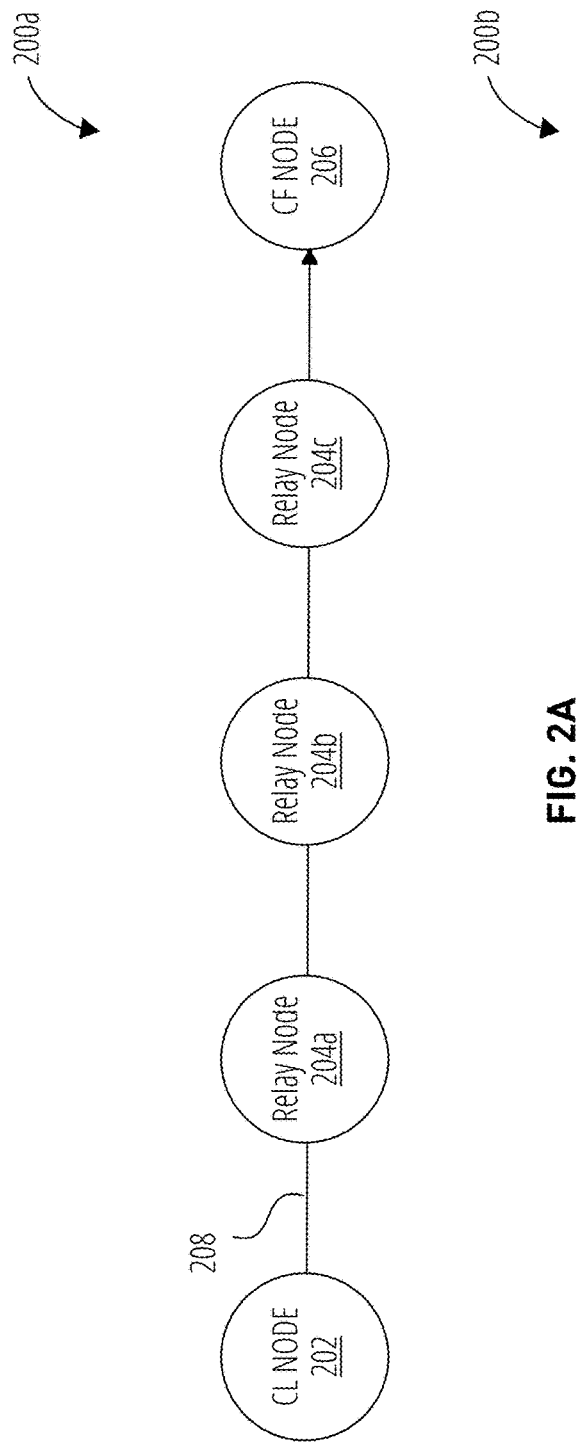
FIG. 2A illustrates an aspect of a TSN 200a in accordance with one embodiment.

FIG. 2A depicts a TSN 200a implemented according to a TSN standard (e.g., IEEE 1588, IEEE 802.1AS, IEEE 802.1Qbv, or the like). As depicted, the TSN 200a includes clock leader node 202, relay nodes 204a, 204b, and 204c, and clock follower node 206, all communicatively coupled via communication channel 208. The clock leader node 202 and the clock follower node 206 have a "master/slave" relationship, where the clock leader node 202 is treated as a "master" device and the clock follower node 206 is treated as a "slave" device. The clock leader node 202 includes a clock that maintains a network time for the time sensitive network 102. The clock follower node 206 includes a clock that synchronizes a clock to the network time via one or more of the messages 112. Alternatively, the clock leader node 202 and the clock follower node 206 may be implemented as a "talker node" and a "listener node", respectively. This configuration refers to data transmission, where the talker node transmits data and the listener node listens or receives data. This configuration is used, for example, in scheduled traffic.

It is noted that the number of nodes in the TSN 200a is selected for purposes of clarity and not limitation. In practice, the TSN 200a can include any number and combination of nodes (e.g., origination nodes, talker nodes, listener nodes, switches, relay nodes, end devices, etc.). Nodes in the TSN 200a (e.g., clock leader node 202, clock follower node 206, relay node 104a, relay node 104b, and relay node 104c, etc.) are provided in a GCL table, which specifies timing for windows in which the nodes can transmit packets on communication channel 208. It is also noted that the terms "switch node" and "relay node" are used interchangeably. For instance, the IEEE 802.AS defines protocol-aware switches as relays.

Relay nodes 204a, 204b, and 204c are time-aware switching nodes and can be any number of devices in a network arranged to communicate information. A clock leader node 202 sends or originates information and a clock follower node 206 receives or consumes information. Examples of a clock leader node 202 or a clock follower node 206 include devices such as electronic control units in an autonomous vehicle, an industrial system, a medical system, or the like. Additionally, communication channel 208 can be any of a variety of communication channels, including wired or wireless communication channels. In some implementations, all devices in the TSN 200a will receive GCL tables. However, in some implementations, only clock leader nodes 202 and switching nodes (e.g., relay node 204a, etc.) receive GCL tables while destination devices (e.g., clock follower node 206) do not receive a GCL table.

Figure 2B:
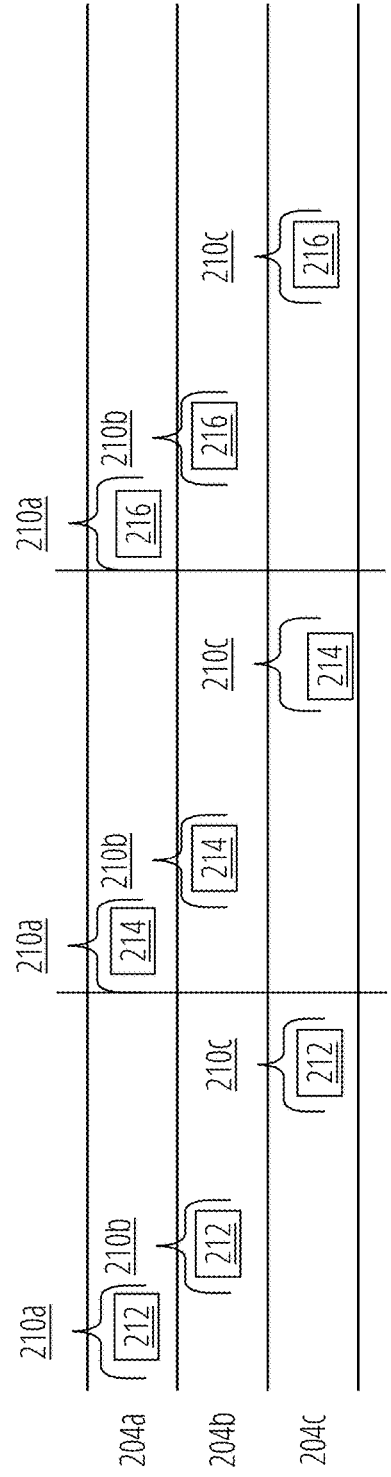
FIG. 2B illustrates an aspect of a timing diagram 200b in accordance with one embodiment.

FIG. 2B depicts a timing diagram 200b depicting communication windows (e.g., Qbv windows, or the like) for switches of TSN 200a based on GCL tables. Typically, GCL tables are generated in a network controller (not shown) and are designed to prioritize time critical (TC) traffic and prevent lower priority traffic from accessing communication channel 208, thus guaranteeing the timely delivery of TC packets within pre-configured time windows. In particular, timing diagram 200b depicts Qbv windows 210a, 210b, and 210c in which packets 212, 214, and 216 are transmitted. It is noted that the communication windows referred to herein are referred to as Qbv windows or protected windows for clarity. However, other standard or techniques for forming protected communication windows to facilitate time synchronization can be used besides Qbv windows. Examples are not limited in this context.

To facilitate transmission of packets (e.g., packet 212, etc.) during protected windows (e.g., Qbv window 210a, etc.), nodes in the TSN 200a are time synchronized and scheduled to transmit TC packets (e.g., packet 212, etc.) using non overlapping protected windows (e.g., Qbv window 210a, etc.). It is to be appreciated that providing latency bounded communication (e.g., as depicted in timing diagram 200b) requires tight synchronization of time between nodes in TSN 200a. With such dependency on time synchronization, reliable TSN operation can be disrupted by attacking the timing of the network, sometimes referred to as a desynchronization attack or event.

Figure 3A:
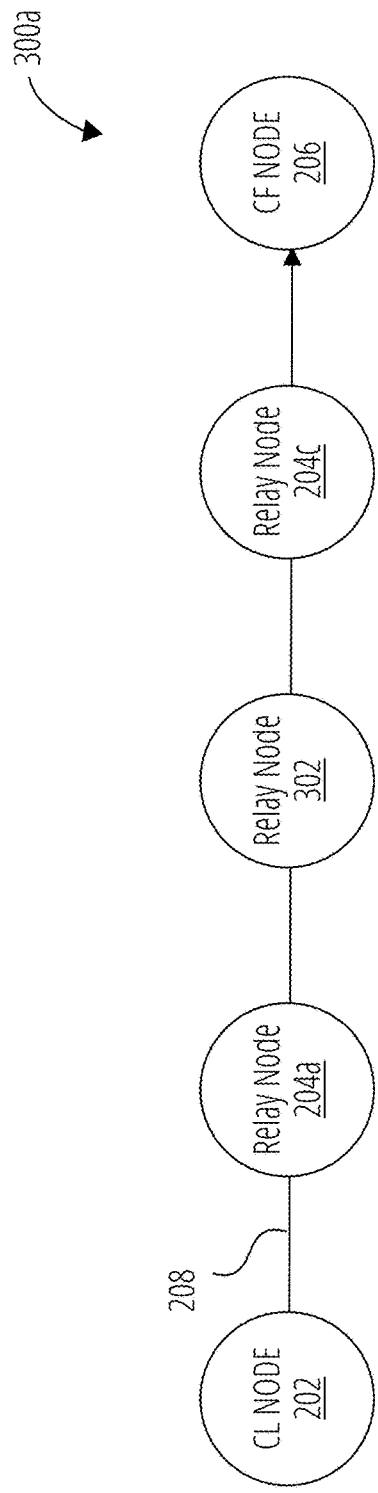
FIG. 3A illustrates an aspect of a TSN 300a in accordance with one embodiment.

FIG. 3A depicts a TSN 300a, which is like TSN 200a except that the relay node 302 is depicted as compromised. In particular, the clock (not shown) of relay node 302 can be attacked and compromised, thereby causing the Qbv window 210b associated with relay node 302 to be misaligned with respect to, and even overlap with, the protected windows of the other switch nodes in the data stream path (e.g., along communication channel 208).

Figure 3B:
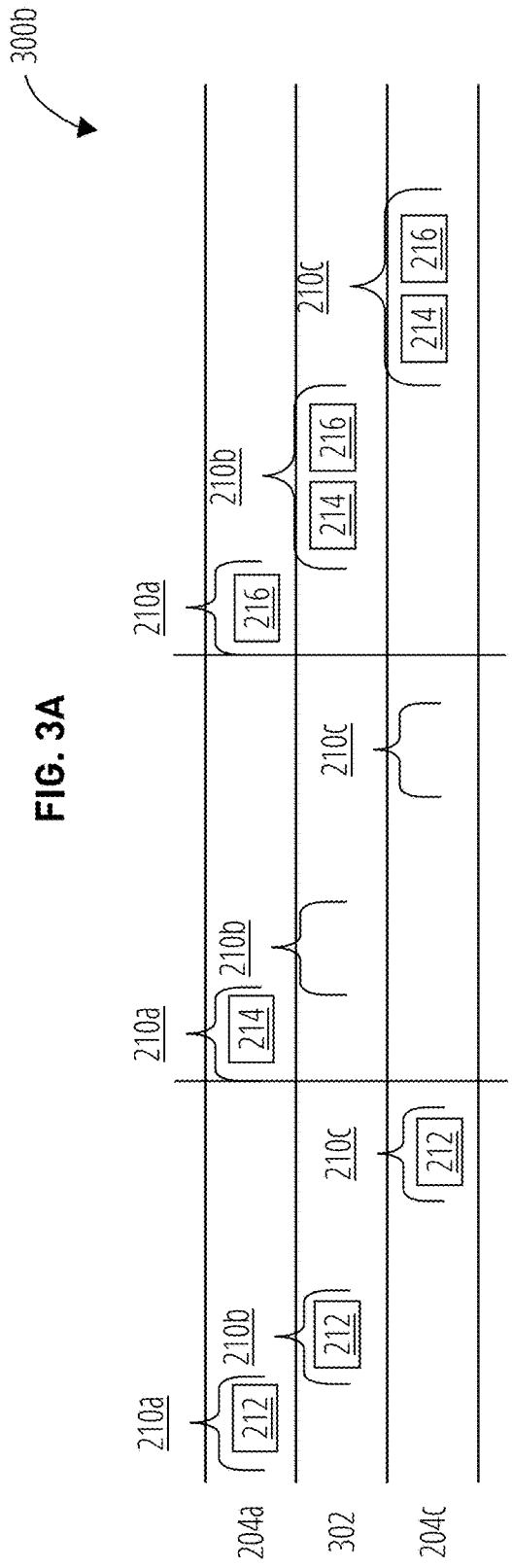
FIG. 3B illustrates an aspect of a timing diagram 300b in accordance with one embodiment.
Figure 4:
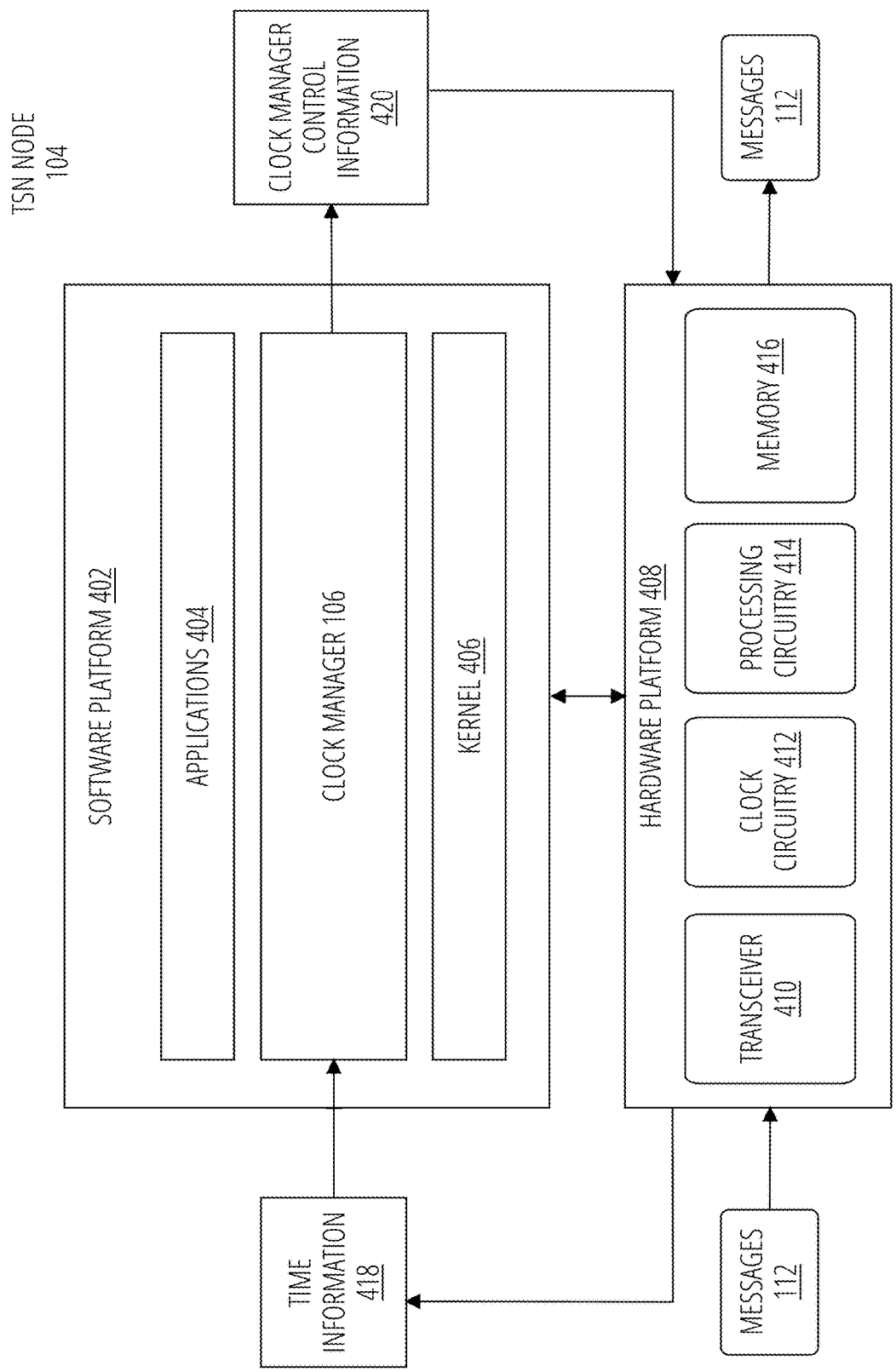
FIG. 4 illustrates an aspect of a TSN node 104 in accordance with one embodiment.

FIG. 3B depicts timing diagram 300b illustrating Qbv window 210b misaligned with Qbv window 210a and Qbv window 210c and overlapping with Qbv window 210a. As such, packets (e.g., packet 214 in the figure) arrive too late with respect to the attacked switch protected window (e.g., Qbv window 210b) causing them to be buffered and sent in the next protected window. As a result of the delay in transmitting packet 214, relay node 302 breaks the latency bound of the stream that it is serving and can result in errors or comprise the safety of the system in which the nodes are operating FIG. 4 illustrates a more detailed view of a TSN node 104 that implements one or more TSN protocols or standards. The TSN node 104 may be implemented as any network devices suitable for operation within a TSN, such as TSN 102, 200a, 300a, and so forth. The TSN node 104 may be implemented as part of a vehicle, robot, industrial machine or any other devices suitable for a TSN. The TSN node 104 may be implemented as an origination node 202, relay nodes 204a-204c, relay node 302 and/or end node 206. The TSN node 104 may be implemented as either a clock leader (CL) or a clock follower (CF) in a TSN. The TSN node 104 may include interfaces to communicate information with other TSN nodes 104 in the TSN 102, such as messages 112, for example.

The TSN node 104 may operate in accordance with a timing protocol, such as a precision time protocol (PTP) for IEEE 1588, IEEE 802.1AS, IEEE 802.15.4, and so forth. For instance, the TSN node 104 may operate in accordance with IEEE 802.1AS which implements a hierarchical network to synchronize clock followers (CFs) to a clock leader (CL) through relays or switch nodes. Synchronization is performed through communication of time messages, such as the messages 112. The time messages may comprise, for example, time synchronization messages, time update messages or time follow-up messages (among others) for a PTP. The time messages may include, among other fields and attributes, a correction field, which accumulates a network residence, and an origin timestamp for a CL. The time message may also comprise, for example, a packet delay message type with additional fields and attributes.

As depicted in FIG. 4, the TSN device 104 may include a software platform 402 and a hardware platform 408. The software platform 402 may include, among other software components, one or more applications 404, a clock manager 106, and a kernel 406. The hardware platform 408 may include, among other hardware components, a network interface such as a transceiver 410, clock circuitry 412, processing circuitry 414 and memory 416.

The processing circuitry 414 may include circuitry or processor logic, such as, for example, any of a variety of commercial processors. In some examples, the processing circuitry 414 may include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processing circuitry 414 may include graphics processing portions and may include dedicated memory, multiple-threaded processing and/or some other parallel processing capability. In some examples, the processing circuitry 414 may be an application specific integrated circuit (ASIC) or a field programmable integrated circuit (FPGA). In some examples, the processing circuitry 414 may be circuitry arranged to perform computations related to TSN, such as switching, clock leader, clock follower, routing, security, and so forth.

The memory 416 may include logic, a portion of which includes arrays of integrated circuits, forming non-volatile memory to persistently store data or a combination of non-volatile memory and volatile memory. It is to be appreciated, that the memory 416 may be based on any of a variety of technologies. In particular, the arrays of integrated circuits included in memory 406 may be arranged to form one or more types of memory, such as, for example, dynamic random access memory (DRAM), NAND memory, NOR memory, or the like.

The transceiver 410 may include logic and/or features to support a communication interface. For example, the transceiver 410 may include one or more interfaces that operate according to various communication protocols or standards to communicate over direct or network communication links. Direct communications may occur via use of communication protocols or standards described in one or more industry standards (including progenies and variants). For example, the transceiver 410 may facilitate communication over a bus, such as, for example, peripheral component interconnect express (PCIe), non-volatile memory express (NVMe), universal serial bus (USB), system management bus (SMBus), SAS (e.g., serial attached small computer system interface (SCSI)) interfaces, serial AT attachment (SATA) interfaces, or the like. In some examples, transceiver 410 may be arranged to support wireless communication protocols or standards, such as, for example, Wi-Fi, Bluetooth, ZigBee, LTE, 5G, or the like.

The TSN node 104 may also include where the network is a controller area network (CAN) or a vehicle area network (VAN). The TSN node 104 may be implemented as a device that manages a sensor, actuator or a controller. The sensors may comprise a speed sensor, a direction sensor, a global positioning system (GPS) sensor, a gas pedal sensor, a brake pedal sensor, a positioning sensor, an object detection sensor, a lane detection sensor, a radar sensor, a light detection and ranging (LIDAR) sensor, an ultrasound sensor, an inertial measurement unit (IMU) sensor, a temperature sensor, a pressure sensor, an altitude sensor, an acoustic sensor, and so forth.

In one aspect, the TSN node 104 may be implemented as a CL or CF for the TSN 102. As previously discussed, the clock manager 106 may ensure that the clock circuitry 412 maintains a network time for the TSN 102. When operating in a CL role, the clock manager 106 may send a message 112 with time information 418 representing a current network time to one or more nodes operating in a CF role for the TSN 102. When operating in a CF role, the clock manager 106 may receive a message 112 from a CL node. The clock manager 106 may use the time information 418 from the message 112 to synchronize a local device time with the current network time maintained by the clock circuitry 412. The clock manager 106 analyzes the time information 418, and determines whether to adjust a parameter (e.g., phase or frequency) of the clock circuitry 412 to synchronize the clock circuitry 412 to the current network time.

Figure 5:
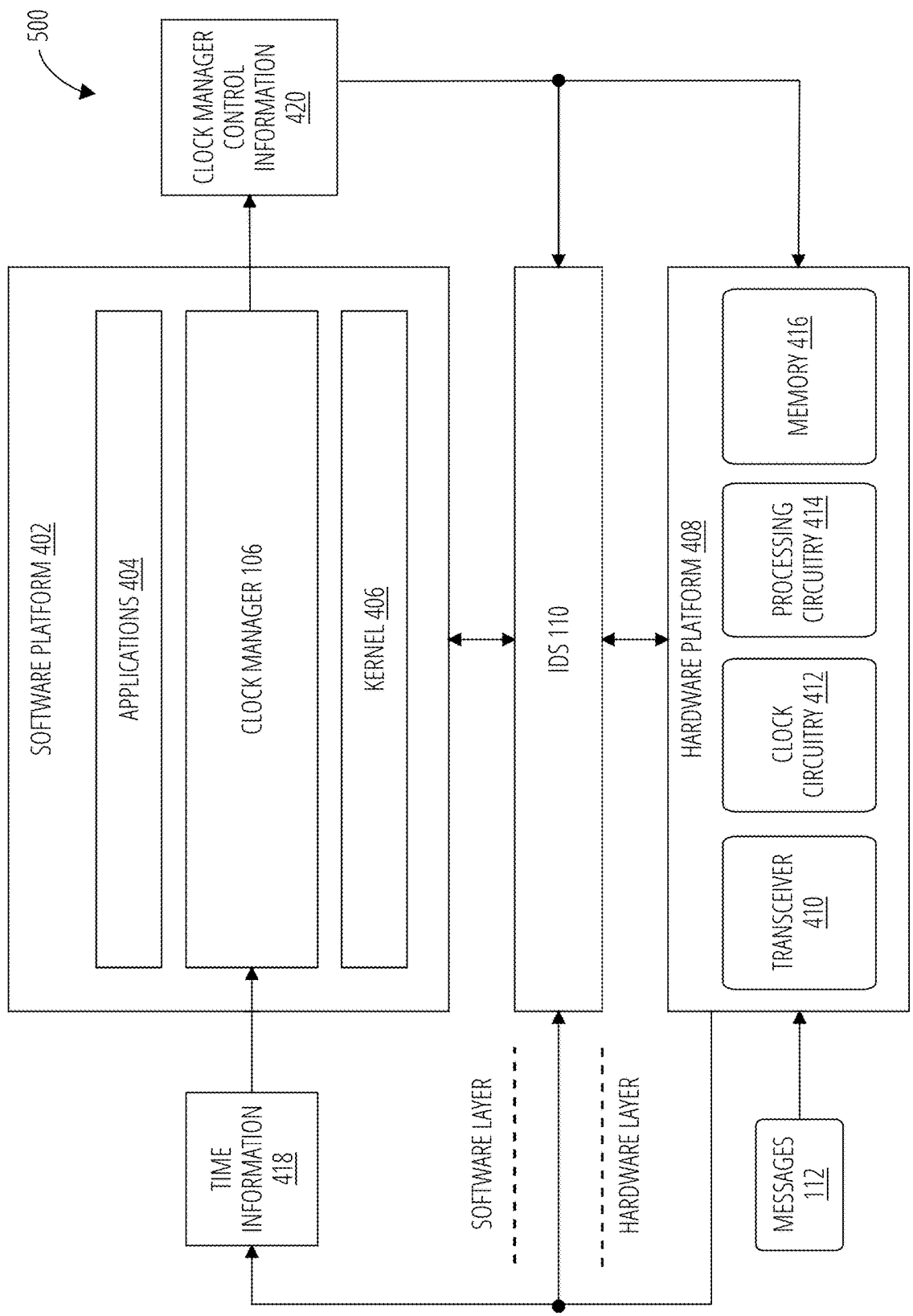
FIG. 5 illustrates an aspect of an apparatus 500 in accordance with one embodiment.

FIG. 5 illustrates an apparatus 500. Similar to the apparatus 400, the apparatus 500 includes a software platform 402 and a hardware platform 408. In addition, the apparatus 500 includes an IDS 110 to monitor a clock manager 106 of the software platform 402. As previously discussed, the IDS 110 generally monitors the clock manager 106 to detect abnormal or malicious behavior of the clock manager 106. More particularly, the IDS 110 monitors the inputs and/or outputs of the clock manager 106, such as consuming the time information 418 sent from the transceiver 410 to the clock manager 106 as input, and the clock manager control information 420 sent from the clock manager 106 to the clock circuitry 412 as output.

As depicted in FIG. 5, the apparatus 500 includes a clock circuitry 412 to implement a hardware clock (e.g., a PHC) for a device, such as a TSN node 104. The apparatus 500 includes a processing circuitry 414 coupled to the clock circuitry 412, the processing circuitry 414 to execute instructions to perform operations for a clock manager 106. The clock manager 106 is operative to receive messages 112 with time information 418 for a network, such as TSN 102. The clock manager 106 generates clock manager control information 420 to adjust the clock circuitry 412 to a network time for the TSN 102. The clock manager control information 420 may comprise one or more parameters to adjust the clock circuitry 412 for the apparatus 500. The one or more parameters may represent, for example, adjustments to a phase or frequency of the clock circuitry 412. For example, the clock manager control information 420 may comprise a phase or frequency adjustment based on a time offset between a reference time and a time maintained by the clock circuitry 412. The reference time is based on the time information 418 in at least one message 112.

The apparatus 500 further includes an IDS 110 coupled to the processing circuitry 414 and the clock circuitry 412. In one embodiment, the IDS 110 may be implemented as part of a software layer for the apparatus 500, such as the software platform 402. In another embodiment, the IDS 110 may be implemented as part of a hardware layer for the apparatus 500, such as the hardware platform 408. In yet another embodiment, certain elements of the IDS 110 may be implemented in the software platform 402, while other elements of the IDS 110 may be implemented in the hardware platform 408. Embodiments are not limited in this context.

Although FIG. 5 depicts the IDS 110 implemented as part of the apparatus 500, it may be appreciated that the IDS 110 may be implemented by another apparatus, device or system communicatively coupled to the apparatus 500. For instance, the IDS 110 may be implemented as part of an intrusion detection system (IDS) for the apparatus 500 that is separate from the apparatus 500 or a device other than a device that implements the apparatus 500. For instance, if the apparatus 500 is implemented by a TSN node 104*a*, the IDS 110 of the apparatus 500 could optionally be implemented in a TSN node 104*b*. The IDS 110 could also be implemented by an IDS communicatively coupled to the TSN node 104, either directly via a wired or wireless connection, or indirectly via the TSN fabric 114. Embodiments are not limited in this context.

The IDS 110 is operative to consume multiple types of information to detect a security attack. For instance, the IDS 110 can receive and analyze messages 112 for a TSN node implementing the software platform 402 and/or the hardware platform 408. The messages 112 may carry time information for a TSN node, such as an origin time, resident time, link delays, among other types of clock information. The messages 112 may comprise, for example, synchronization messages or follow up (e.g., FollowUp) messages. The TSN node retrieves or decodes the time information from the messages 112, and utilize the time information to synchronize an internal local clock with a network time issued by a clock leader or grand clock leader. The IDS 110 can also receive and analyze other types of information, such as clock manager control information 420 in transit from the clock manager 106 of the software platform 402 and the hardware platform 408. For instance, the IDS 110 can consume software control messages, or it can have one or more taps on a hardware bus or signal lines used to communicate electrical signals to the hardware platform 408. The IDS 110 analyzes the messages 112 and/or other types of information, and determines whether to generate an alert or take corrective action for the apparatus 500 based on results of the analysis.

The messages 112 are communicated between TSN nodes at a certain frequency or rate which can be measured in a number of messages sent or received per unit of time, such as a number of messages sent per second. This is referred to herein as a "message frequency." The message frequency for transmission of the messages 112, which carry origin time (Sync/FollowUp) and link delay computation (LDC), is typically dependent on the latency requirements of a time-sensitive application. The message frequency is usually calculated during a design phase for a TSN, taking into account a variety of factors, and instantiated during initialization of a TSN or individual TSN nodes.

Cybersecurity is increasingly becoming a critical or core function within TSN. Numerous security devices, such as the IDS 110, are deployed throughout a TSN. Each deployed IDS 110 monitors a TSN node or group of TSN nodes, receiving the messages 112 and analyzing the messages 112 for anomalies or abnormalities indicative of a security attack. While increasing security of a TSN, the multitude of IDS 110 also inject a certain amount of delay as the messages are communicated throughout the TSN. While a delay caused by a single IDS 110 is tolerable, in aggregation the accumulated delay may impact performance of the TSN and time sensitive applications 404. In addition, while a message frequency may be suitable to meet latency requirements for time sensitive applications 404, the same message frequency may not be fast enough to allow an IDS 110 to detect a cybersecurity attack. This is particularly true for desynchronization attacks that slowly inject delay over longer periods of time. As a consequence, performance of an IDS 110 may be limited by the current parameters. In other words, detection of an ongoing security attack is delayed due to inability to collect features in the optimal amount of time. Currently, these and other cybersecurity requirements are not taken into account while defining the message frequency for a TSN.

To solve these and other challenges, embodiments implement a number of different techniques to define an optimal message frequency that simultaneously and cooperatively satisfies the requirements of one or more time sensitive applications 404 and security mechanisms such as one or more IDS 110 deployed throughout a TSN without overloading a TSN. In some embodiments, principles of operation may include adjusting a frequency of time synchronization messages, such as messages 112, within the acceptable bounds of standard protocols, guided by the requirements of the IDS 110 and one or more time sensitive applications 404. In one embodiment, for example, message frequency may be dynamically accelerated in order to facilitate attack detection while attempting to minimize bandwidth overhead within a TSN.

Embodiments implement at least two sets of solutions. A first solution set involves fixed (or static) scheduling with a message frequency enabling an IDS 110 to detect a security attack before a time sensitive application 404 reaches its maximum tolerable error. A second solution set involves changing (or dynamic) scheduling that relaxes bandwidth requirements in normal operating conditions for a TSN while accelerating message frequency whenever an IDS 110 detects one or more indications suggesting a possibility of a security attack. An accelerated message frequency may allow the IDS 110 to complete or confirm detection of a security attack on a TSN node before a time sensitive application 404 relying on timing information from a hardware clock of the TSN node reaches a maximum tolerable time error before affecting performance. Both solutions sets are described below.

Figure 6:
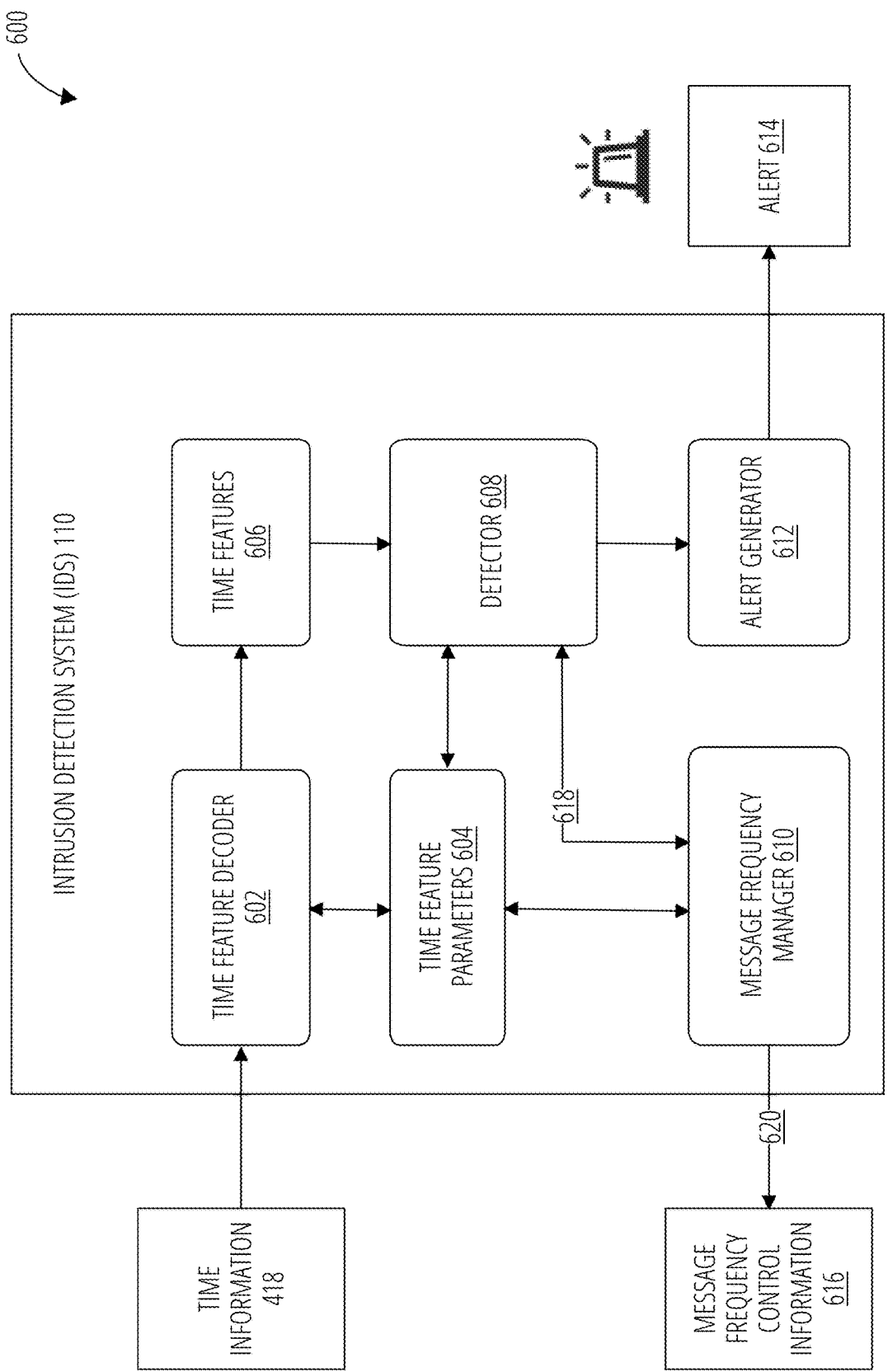
FIG. 6 illustrates an aspect of an intrusion detection system (IDS) 110 in accordance with one embodiment.

FIG. 6 illustrates a system 600 with a more detailed view of an IDS 110. As depicted in FIG. 6, an IDS 110 may include a time feature decoder 602, one or more time feature parameters 604, one or more time features 606, a detector 608, message frequency manager 610, and an alert generator 612. In general, the IDS 110 can receive as input time information 418 from one or more messages 112 intended for a TSN node 104, analyze the time information 418 for potential security threats (e.g., a desynchronization attack), and output an alert 614 and/or message frequency control information 616. The IDS may output the alert 614 when a security attack is suspected or confirmed. The IDS may output the message frequency control information 616 to modify a frequency for messages 112 are communicated within a time sensitive network 102, 200 or 300, such as messages 112 sent from a device operating in a clock leader role and received by a device operating in a clock follower role.

In one embodiment, for example, the IDS 110 may be implemented, at least in part, by a computing apparatus that includes processor circuitry. The computing apparatus also includes a memory communicatively coupled to the processor circuitry, the memory to store instructions that when executed by the processor circuitry, causes the processor circuitry to execute a time feature decoder 602 to receive as input time information 418 from messages 112 communicated in a time sensitive network 102. The time feature decoder 602 may be operative to decode a set of time features 606 from the time information 418 based on a set of time feature parameters 604, and output the set of time features 606. The processor circuitry may also execute a detector 608 to receive as input the set of time features 606 from the time feature decoder 602, detect one or more indications of a security attack based on the set of time features 606, and output a frequency control signal 618. The processor circuitry may also execute a message frequency manager 610 to receive as input the frequency control signal 618, and determine a defined frequency 620 for the messages 112 communicated in the time sensitive network 102 to assist in detection of the security attack. The message frequency manager 610 may output message frequency control information 616 with the defined frequency 620. For instance, the IDS 110 may send the message frequency control information 616 with the defined frequency 620 to a device operating in a clock leader role for the time sensitive network 102.

In various embodiments, the computing apparatus may also include where the device operates in accordance with an Institute of Electrical and Electronics Engineers (IEEE) 802.1AS, IEEE 802.1Qbv, IEEE 802.15.4, or IEEE 1588 standards. The computing apparatus may also include where the network time is a precision time protocol (PTP) time. The computing apparatus may also include where the messages are synchronization messages or follow up messages for a precision time protocol (PTP). The computing apparatus may also include where the clock managed by the clock circuitry is a precision time protocol (PTP) hardware clock (PHC). The computing apparatus may also include where the device operates in a clock follower role of the time-synchronized network. The computing apparatus may also include where the messages with time information are received from a device operate in a clock leader role of the time-synchronized network.

Figure 7:
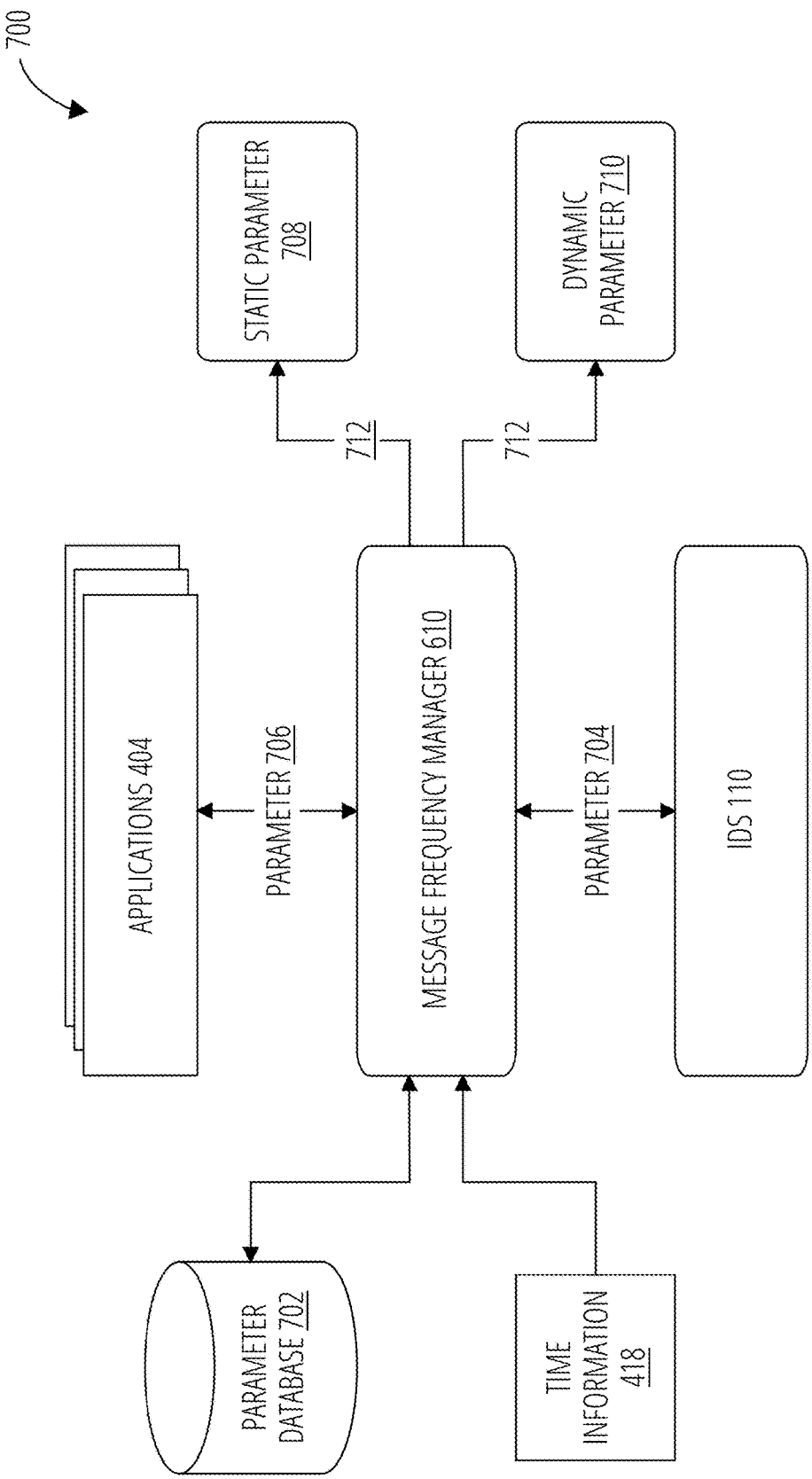
FIG. 7 illustrates an aspect of a system 700 in accordance with one embodiment.

FIG. 7 illustrates a system 700. Similar to the system 600, the system 700 includes the message frequency manager 610. The message frequency manager 610 may retrieve a set of parameters related to the time sensitive network 102.

As depicted in FIG. 7, for example, the message frequency manager 610 may retrieve a first parameter 704 for an intrusion detection system (IDS) 110 to monitor a device for a time sensitive network 102. The first parameter 704 may represent a number of messages 112 the IDS 110 needs to analyze in order to detect a security attack on the device. The messages 112 may comprise time information 418 to synchronize a clock 108 for the device to a network time for the time sensitive network 102.

The message frequency manager 610 may also retrieve a second parameter 706 for a time sensitive application 404. The time sensitive application 404 may receive time information from the synchronized clock 108 of the device via an application program interface (API). The second parameter 706 may represent a defined amount of time error tolerated by the time sensitive application 404.

The message frequency manager 610 may determine a third parameter 712 for the IDS 110 based on the first parameter 704 and the second parameter 706. The third parameter 712 may represent a defined frequency to receive a number of messages 112 with time information 418 in order to detect the security attack on the device within a defined time interval.

Although the system 700 depicts the message frequency manager 610 retrieving parameters 704, 706 directly from the IDS 110 and the application 404, respectively, it may be appreciated that the message frequency manager 610 may also retrieve the parameters 704, 706 from a parameter database 702. The parameters 704, 706 stored in the parameter database 702 may be predefined or pre-computed off-line, and indexed to allow quick retrieval by the message frequency manager 610. Similarly, the parameter 712 may also be predefined or pre-computed based on a set of stored parameters 704, 706, thereby allowing quick retrieval by the message frequency manager 610 rather than performing real-time calculations in response to a detected security attack. Embodiments are not limited in this respect.

Calculation of the third parameter 712 begins with a fundamental observation that error accumulated by a time sensitive application ($E^{App}$) should not surpass an amount of deviation needed by an IDS to detect an attack ($E^{IDS}$), i.e., $E^{App} \le E^{IDS}$. This material condition is shown in Equation (1) as follows:

$$E^{IDS}=A\times Fs\times Ld \rightarrow E^{App} \le A\times Ld\times Fs \qquad \text{EQUATION (1)}$$

In Equation (1), $E^{IDS}$ represents an amount of error intercepted by an IDS, A represents an amplitude of attack in messages per second, Fs represents a frequency of time synchronization messages in messages per second, Ld represents a latency of detection, and $E^{App}$ represents a maximum amount of error tolerated by an application in seconds.

In one embodiment, the third parameter 712 may comprise a static parameter 708. In another embodiment, the third parameter 712 may comprise a dynamic parameter 710. It may be appreciated that the third parameter 712 may be implemented as other types of parameters for the time sensitive network 102, such as both a static parameter 708 during initialization and startup phase of devices within the time sensitive network 102, and a dynamic parameter 710 during operations of devices within the time sensitive network 102. Embodiments are not limited in this respect.

When the third parameter 712 is implemented as a static parameter 708, the message frequency manager 610 may calculate the static parameter 708 in accordance with the material condition of Equation (1) as set forth in Equation (2) as follows:

$$Fs \ge E^{App}/(Ld\times A) \qquad \text{EQUATION (2)}$$

In Equation (2), Fs represents a frequency of time synchronization messages in messages per second, $E^{App}$ represents a maximum amount of error tolerated by an application in seconds, Ld represents a latency of detection, and A represents an amplitude of attack in messages per second.

As indicated in Equations (1) and (2), the message frequency manager 610 may determine an amount of intercepted time error for IDS detection of the security attack based on an amplitude for the security attack multiplied by a candidate frequency of messages received by the IDS multiplied by a latency of detection for the IDS. The message frequency manager 610 may determine the defined amount of time error tolerated by the time sensitive application based on the amplitude for the security attack multiplied by the candidate frequency of messages received by the IDS multiplied by the latency of detection for the IDS. The message frequency manager 610 may select the candidate frequency as the defined frequency when the candidate frequency is greater than or equal to the defined amount of time error tolerated by the time sensitive application divided by the latency of detection for the IDS multiplied by the amplitude for the security attack. The message frequency manager 610 may set the candidate frequency to the defined frequency for the third parameter.

When the third parameter 712 is implemented as a dynamic parameter 710, the message frequency manager 610 may calculate the dynamic parameter 710 in accordance with Equation (3) as follows:

$$Fs' \ge (E^{IDS}-(A\times Fs\times Tt))/(A\times(Ld-Tt)) \qquad \text{EQUATION (3)}$$

In Equation (3), Fs' represents a catch-up frequency of time synchronization messages in messages per second, $E^{IDS}$ represents an amount of error intercepted by an IDS, A represents an amplitude of attack in messages per second, Fs represents a frequency of time synchronization messages in messages per second, Tt represents a first detection trigger at a given time of the IDS, and Ld represents a latency of detection. The message frequency manager 610 may calculate an IDS error accumulation catch-up for a high confidence trigger in accordance with Equation (4) as follows:

$$E^{IDS}-E^{Dt} \le A\times Fs'\times(Ld-Tt) \qquad \text{EQUATION (4)}$$

In Equation (4), Fs' represents a catch-up frequency of time synchronization messages in messages per second, $E^{IDS}$ represents an amount of error intercepted by an IDS, A represents an amplitude of attack in messages per second, Fs represents a frequency of time synchronization messages in messages per second, Tt represents a first detection trigger at a given time of the IDS, Ld represents a latency of detection, and $E^{Dt}$ represents an amount of error intercepted by the IDS at a given time Tt. The message frequency manager 610 may calculate $E^{Dt}$ in accordance with Equation (5) as follows:

$$E^{Dt}=A\times Fs\times Tt \qquad \text{EQUATION (5)}$$

In Equation (5), $E^{Dt}$ represents an amount of error intercepted by the IDS at a given time Tt, A represents an amplitude of attack in messages per second, Fs represents a frequency of time synchronization messages in messages per second, and Tt represents a first detection trigger at a given time of the IDS. The message frequency manager 610 may solve for Fs' as shown in Equation (6) as follows:

$$Fs' \le (E^{IDS}-E^{Dt})/(A\times(Ld-Tt)) \qquad \text{EQUATION (6)}$$

In accordance with Equations (3)-(6), the message frequency manager 610 may calculate a dynamic parameter 710 as a catch-up frequency Fs' as shown in Equation (7) as follows:

$$Fs' \ge (E^{IDS}-(A\times Fs\times Tt))/(A\times(Ld-Tt)) \qquad \text{EQUATION (7)}$$

As indicated in Equations (3) to (7), the message frequency manager 610 may determine an amount of intercepted time error for IDS detection of the security attack based on an amplitude for the security attack multiplied by a candidate frequency of messages received by the IDS multiplied by a latency of detection for the IDS. The message frequency manager 610 may determine a partial amount of intercepted time error for a first level of IDS detection of the security attack based on an amplitude for the security attack multiplied by a candidate frequency of messages received by the IDS multiplied by a first defined time interval. The message frequency manager 610 may determine a catch-up amount of intercepted time error that is less than or equal to the amplitude for the security attack multiplied by a catch-up frequency of messages received by the IDS multiplied by the latency of detection for the IDS minus the first defined time interval. The message frequency manager 610 may select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval. The message frequency manager 610 may set the catch-up frequency to the defined frequency for the third parameter.

The message frequency manager 610 may modify the third parameter based on modifications to the first parameter or the second parameter, and send a request message to a device operating in a clock leader role for the time-synchronized network, the request message to request the device operating in the clock leader role to send messages with time information for the time-synchronized network in accordance with the modified third parameter. The message frequency manager 610 may also modify the third parameter on a periodic, aperiodic or on-demand basis.

Various examples of operating environments, logic flows and use case scenarios for the message frequency manager 610 to compute and deploy a static parameter 708 or a dynamic parameter 710 in a TSN will be further discussed with reference to FIGS. 8-18.

Figure 8:
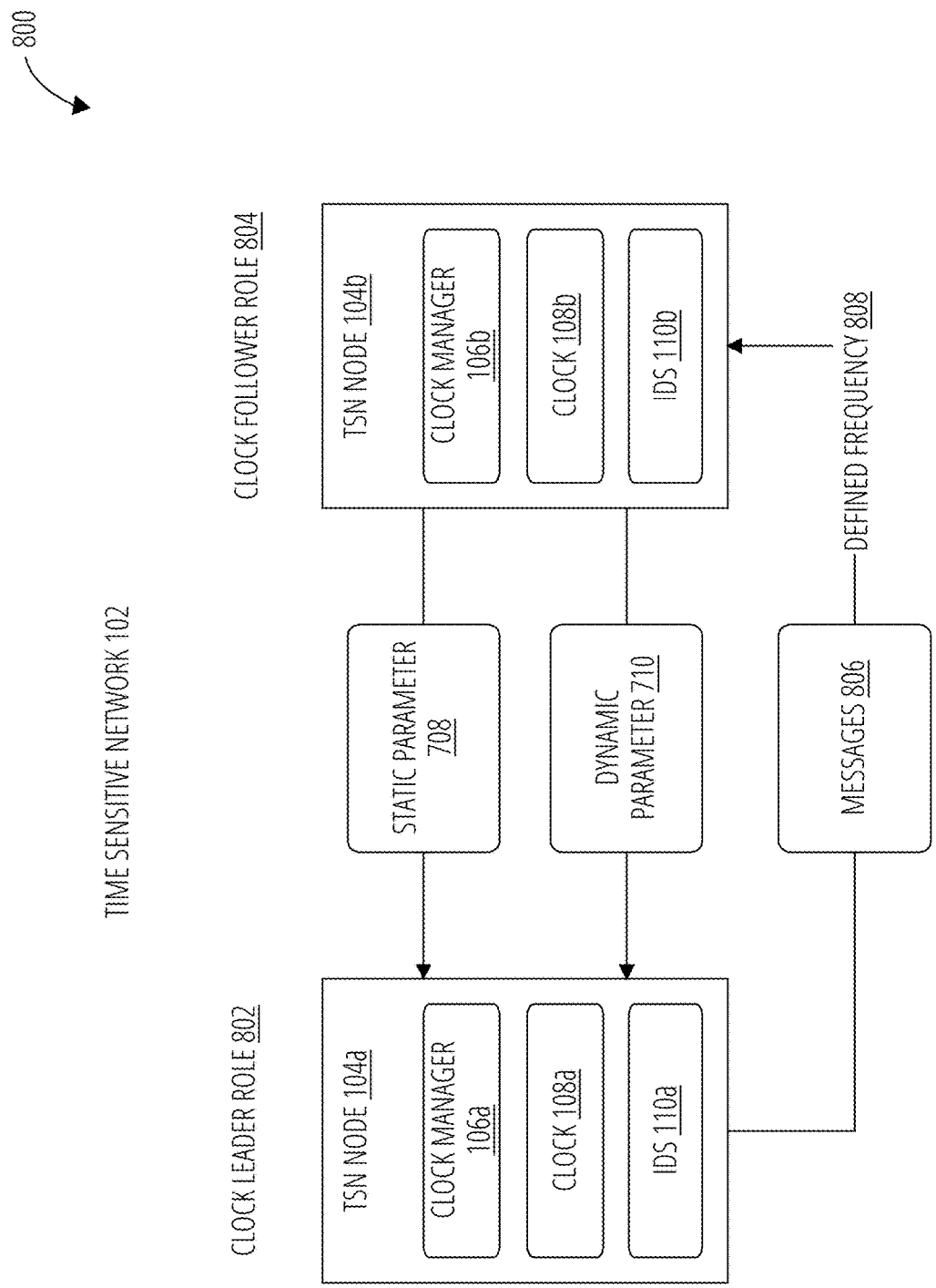
FIG. 8 illustrates an aspect of a system 800 in accordance with one embodiment.

FIG. 8 illustrates a system 800. The system 800 depicts communications between a pair of TSN nodes 104a, 104b in the time sensitive network 102. The TSN node 104a operates in a clock leader role 802. In the clock leader role 802, the TSN node 104a sends messages 112 with time information 418 representing a network time maintained by the clock 108a for the time sensitive network 102 to the TSN node 104b. The TSN node 104b operates in a clock follower role 804. In the clock follower role 804, the TSN node 104b receives messages 112 with time information 418 representing a network time for the time sensitive network 102 from the TSN node 104a. The TSN node 104b may update the clock 108b based on the time information 418 carried by the messages 112, in order for the clocks 108a, 108b to become synchronized.

As depicted in FIG. 8, the TSN nodes 104a, 104b may include IDS 110a, 110b, respectively. Prior to the TSN node 104a sending the messages 112 to the TSN node 104b, the IDS 110a of the TSN node 104a may inspect the messages 112 for indicia of a security attack. Similarly, the IDS 110b of the TSN node 104b may receive the messages 112 sent from the TSN node 104a, and inspect the message messages 112 for indicia of a security attack. In either case, the IDS 110a or the IDS 110b may generate a parameter 712 to adjust a message frequency for the TSN node 104a to a defined frequency 620.

As previously discussed, the defined frequency 620 may be a static parameter 708. When implemented as a static parameter 708, a message frequency manager 610 for the TSN node 104a or the TSN node 104b (or another TSN device) may generate the static parameter 708, and send the static parameter 708 to the TSN node 104a operating in the clock leader role 802. The TSN node 104a may receive the static parameter 708, and use the defined frequency 620 indicated by the static parameter 708 to initialize a device such as the TSN node 104a in preparation for operation in the clock leader role 802 for the time sensitive network 102 to send messages 112 with time information 418 for the time sensitive network 102 in accordance with the defined frequency 620.

The defined frequency 620 may also be implemented as a dynamic parameter 710. When implemented as a dynamic parameter 710, a message frequency manager 610 for the TSN node 104a or the TSN node 104b (or another TSN device) may generate the dynamic parameter 710, and send the dynamic parameter 710 to the TSN node 104a operating in the clock leader role 802. The TSN node 104a may receive the dynamic parameter 710, and use the defined frequency 620 indicated by the dynamic parameter 710 to cause a device such as the TSN node 104a while operating in the clock leader role 802 for the time sensitive network 102 to send messages 112 with time information 418 for the time sensitive network 102 in accordance with the defined frequency 620.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 9:
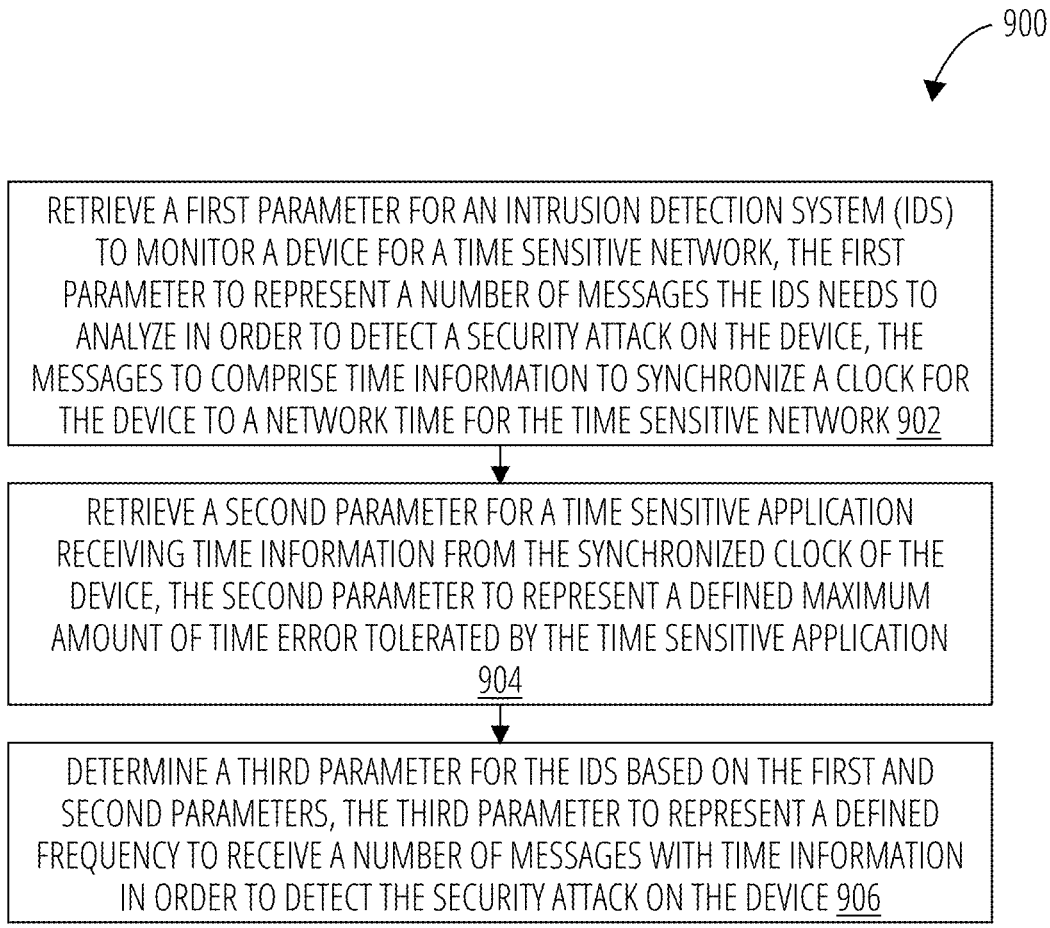
FIG. 9 illustrates a logic flow 900 in accordance with one embodiment.

FIG. 9 illustrates an embodiment of a logic flow 900. The logic flow 900 may be representative of some or all of the operations executed by one or more embodiments described herein. For example, the logic flow 900 may include some or all of the operations performed by devices or entities within the time-synchronized networks 102, 200 or 300, the TSN node 104, the apparatus 500, as well as the system 600, the system 700, or the system 800. More particularly, the logic flow 900 illustrates a use case where the message frequency manager 610 generates the parameters 704, 706 and/or 712. Embodiments are not limited in this context.

In block 902, logic flow 900 retrieves a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network. For example, the message frequency manager 610 may retrieve a first parameter 704 for an IDS 110 to monitor a device such as TSN node 104b for a time sensitive network 102. The first parameter 704 may represent a number of messages 112 the IDS 110 needs to analyze in order to detect a security attack on the TSN node 104b. The messages 112 may comprise time information 418 to synchronize a clock 108b for the TSN node 104b to a network time for the time sensitive network 102, as maintained by the clock 108a of the TSN node 104a.

In block 904, logic flow 900 retrieves a second parameter for a time sensitive application receiving time information from the synchronized clock of the device, the second parameter to represent a defined maximum amount of time error tolerated by the time sensitive application. For example, the message frequency manager 610 may retrieve a second parameter 706 for a time sensitive application 404 receiving time information 418 from the synchronized clock 108b of the TSN node 104b. The second parameter 706 may represent a defined maximum amount of time error tolerated by the time sensitive application 404.

In block 906, logic flow 900 determines a third parameter for the IDS based on the first and second parameters, the third parameter to represent a defined frequency to receive a number of messages with time information in order to detect the security attack on the device. For example, the message frequency manager 610 may determine a third parameter 712 for the IDS 110b based on the first parameter 704 and second parameter 706. The third parameter 712 may represent a defined frequency 620 to receive a number of messages 112 with time information 418 in order to detect the security attack on the TSN node 104b.

Figure 10:
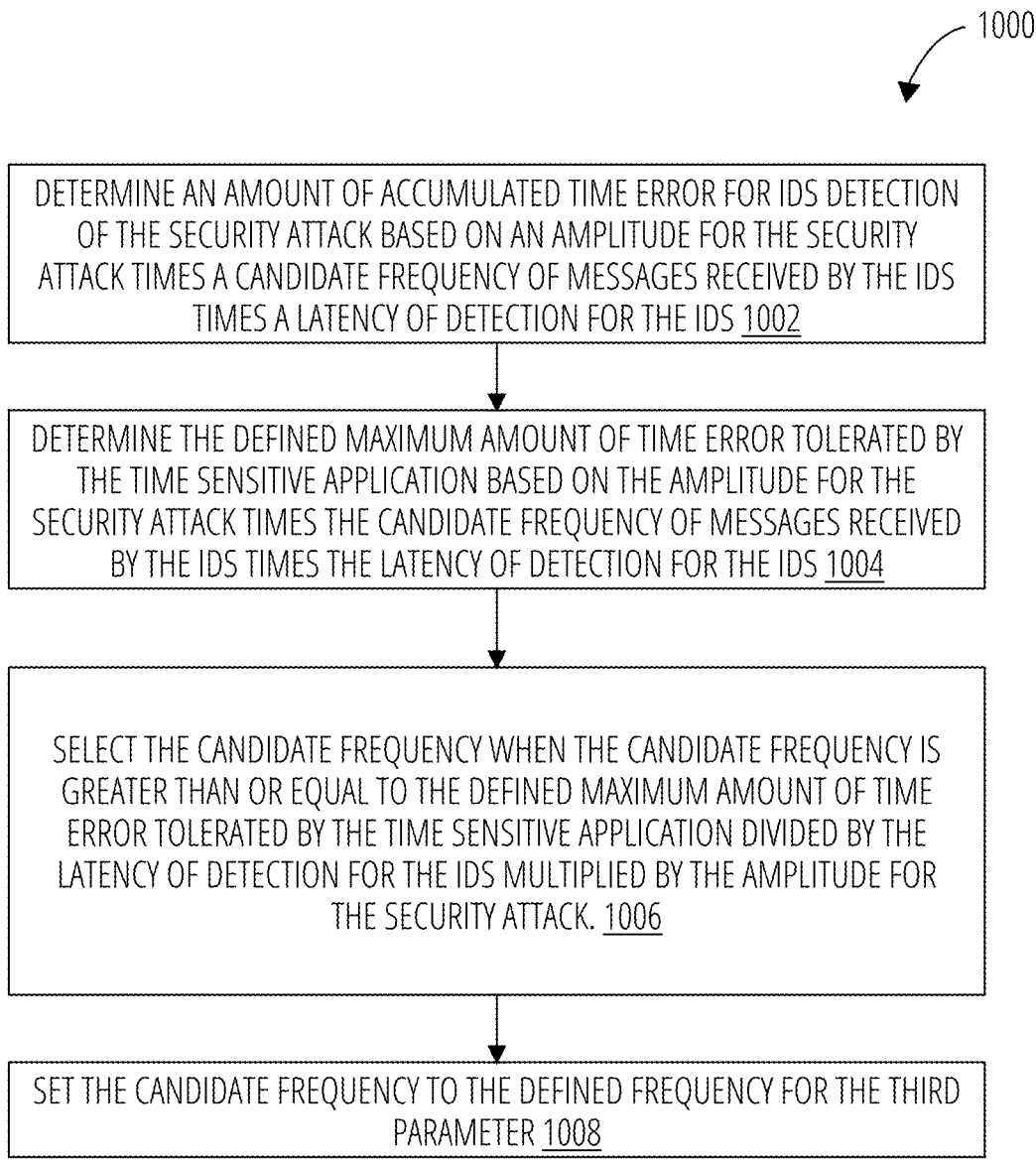
FIG. 10 illustrates a logic flow 1000 in accordance with one embodiment.

FIG. 10 illustrates an embodiment of a logic flow 1000. The logic flow 1000 may be representative of some or all of the operations executed by one or more embodiments described herein. For example, the logic flow 1000 may include some or all of the operations performed by devices or entities within the time sensitive networks 102, 200 or 300, the TSN node 104, the apparatus 500, as well as the system 600, the system 700, or the system 800. More particularly, the logic flow 1000 illustrates a use case where the message frequency manager 610 generates the parameter 712 as a static parameter 708. Embodiments are not limited in this context.

In block 1002, logic flow 1000 determines an amount of intercepted time error for IDS detection of the security attack based on an amplitude for the security attack multiplied by a candidate frequency of messages received by the IDS multiplied by a latency of detection for the IDS. For example, the message frequency manager 610 may determine $E^{IDS}$ in accordance with Equation (1).

In block 1004, logic flow 1000 determines the defined maximum amount of time error tolerated by the time sensitive application based on the amplitude for the security attack multiplied by the candidate frequency of messages received by the IDS multiplied by the latency of detection for the IDS. For example, the message frequency manager 610 may determine $E^{App}$ in accordance with Equation (1).

In block 1006, logic flow 1000 selects the candidate frequency when the candidate frequency is greater than or equal to the defined maximum amount of time error tolerated by the time sensitive application divided by the latency of detection for the IDS multiplied by the amplitude for the security attack. For example, the message frequency manager 610 may determine Fs in accordance with Equation (2).

In block 1008, logic flow 1000 sets the candidate frequency to the defined frequency for the third parameter. For instance the message frequency manager 610 may set the static parameter 708 to Fs determined in accordance with Equation (2).

Figure 11:
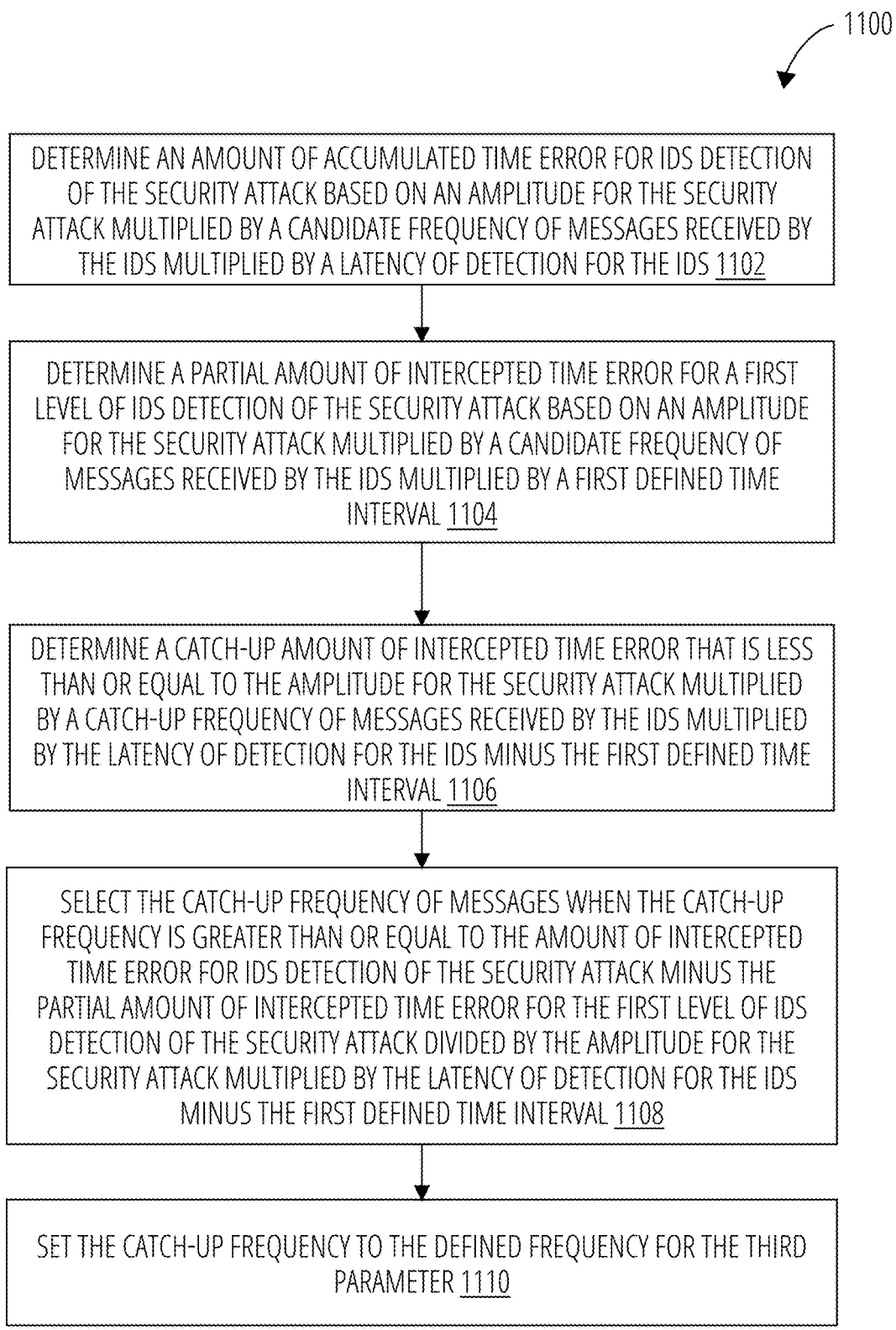
FIG. 11 illustrates a logic flow 1100 in accordance with one embodiment.

FIG. 11 illustrates an embodiment of a logic flow 1100. The logic flow 1100 may be representative of some or all of the operations executed by one or more embodiments described herein. For example, the logic flow 1100 may include some or all of the operations performed by devices or entities within the time sensitive networks 102, 200 or 300, the TSN node 104, the apparatus 500, as well as the system 600, the system 700, or the system 800. More particularly, the logic flow 1100 illustrates a use case where the message frequency manager 610 generates the parameter 712 as a dynamic parameter 710. Embodiments are not limited in this context.

In block 1102, logic flow 1100 determines an amount of intercepted time error for IDS detection of the security attack based on an amplitude for the security attack multiplied by a candidate frequency of messages received by the IDS multiplied by a latency of detection for the IDS. For example, the message frequency manager 610 may determine $E^{App}$ in accordance with Equation (1).

In block 1102, logic flow 1100 determines a partial amount of intercepted time error for a first level of IDS detection of the security attack based on an amplitude for the security attack multiplied by a candidate frequency of messages received by the IDS multiplied by a first defined time interval. For example, the message frequency manager 610 may determine $E^{Dt}$ in accordance with Equation (5).

In block 1102, logic flow 1100 determines a catch-up amount of intercepted time error that is less than or equal to the amplitude for the security attack multiplied by a catch-up frequency of messages received by the IDS multiplied by the latency of detection for the IDS minus the first defined time interval. For example, the message frequency manager 610 may determine $E^{IDS}-E^{Dt}$ in accordance with Equation (4).

In block 1102, logic flow 1100 selects the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval. For example, the message frequency manager 610 may determine Fs' in accordance with Equations (6) and (7).

In block 1102, logic flow 1100 sets the catch-up frequency to the defined frequency for the third parameter. For example, the message frequency manager 610 may set the dynamic parameter 710 to Fs' determined in accordance with Equations (6) and (7).

Figure 12:
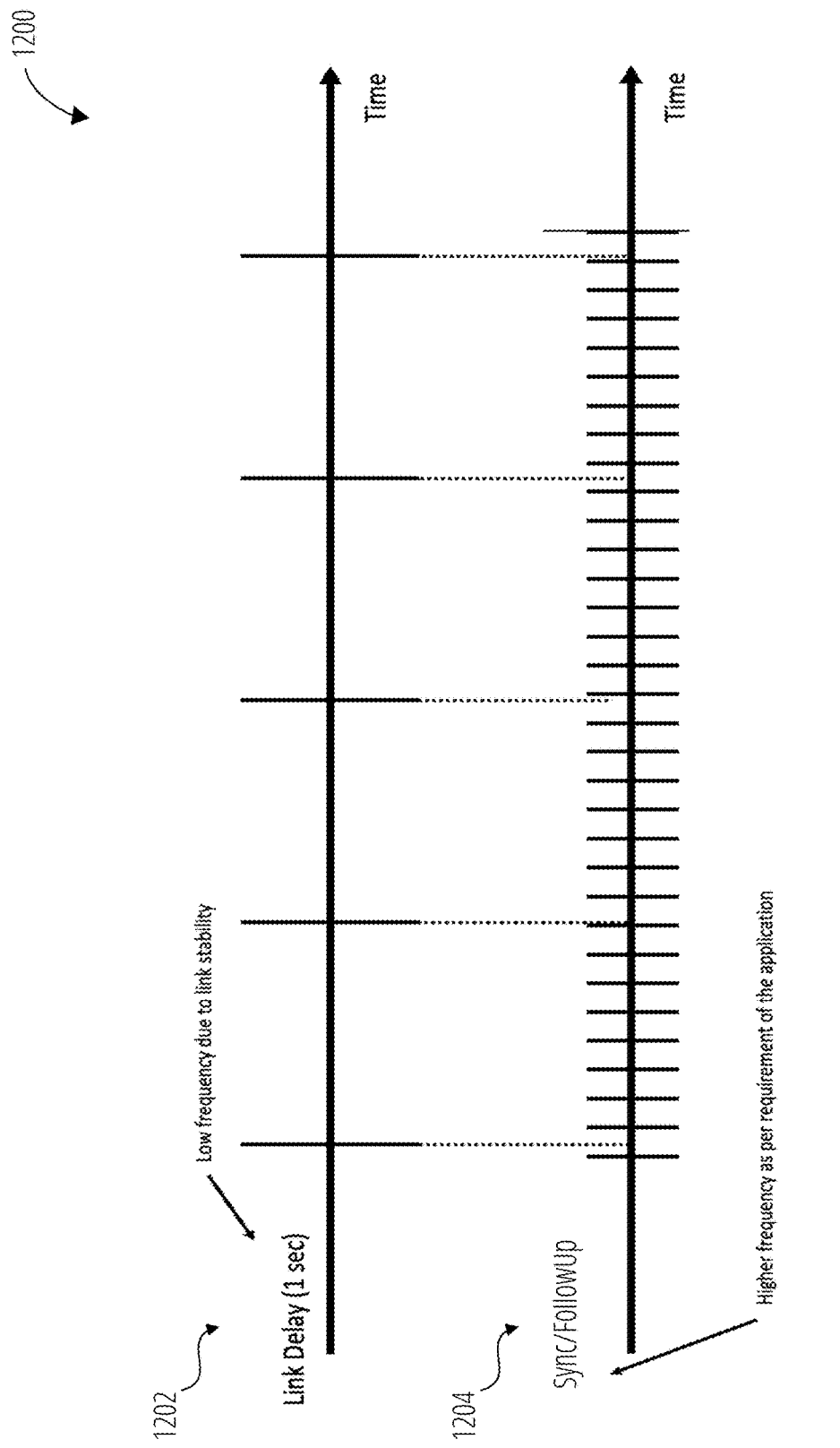
FIG. 12 illustrates an aspect of the subject matter in accordance with one embodiment.

FIG. 12 illustrates an operating environment 1200 suitable for TSN nodes 104, clock leader node 202, relay nodes 204a-c, clock follower node 206, relay node 302, system 600, system 700, system 800, or apparatus 500. The operating environment 1200 depicts a timeline 1202 and a timeline 1204 that provide examples of messages 112 with time information 418 representing origin time and link delay. The timeline 1202 illustrates a case where the messages 112 have a link delay computation messages of approximately 1 second. The lower frequency of 1 second is due to link stability. The timeline 1204 illustrates a case where the messages 112 are time synchronization messages or follow up messages with a frequency of 125 milliseconds (ms). The higher frequency of 125 ms is due to time constraints for time sensitive applications 404. Neither frequency rate takes security requirements into account. It is worthy to note that the frequencies are by way of example and not limitation. TSN protocols or applications may necessitate other frequency rates for a given implementation. Embodiments are not limited in this context.

Figure 13:
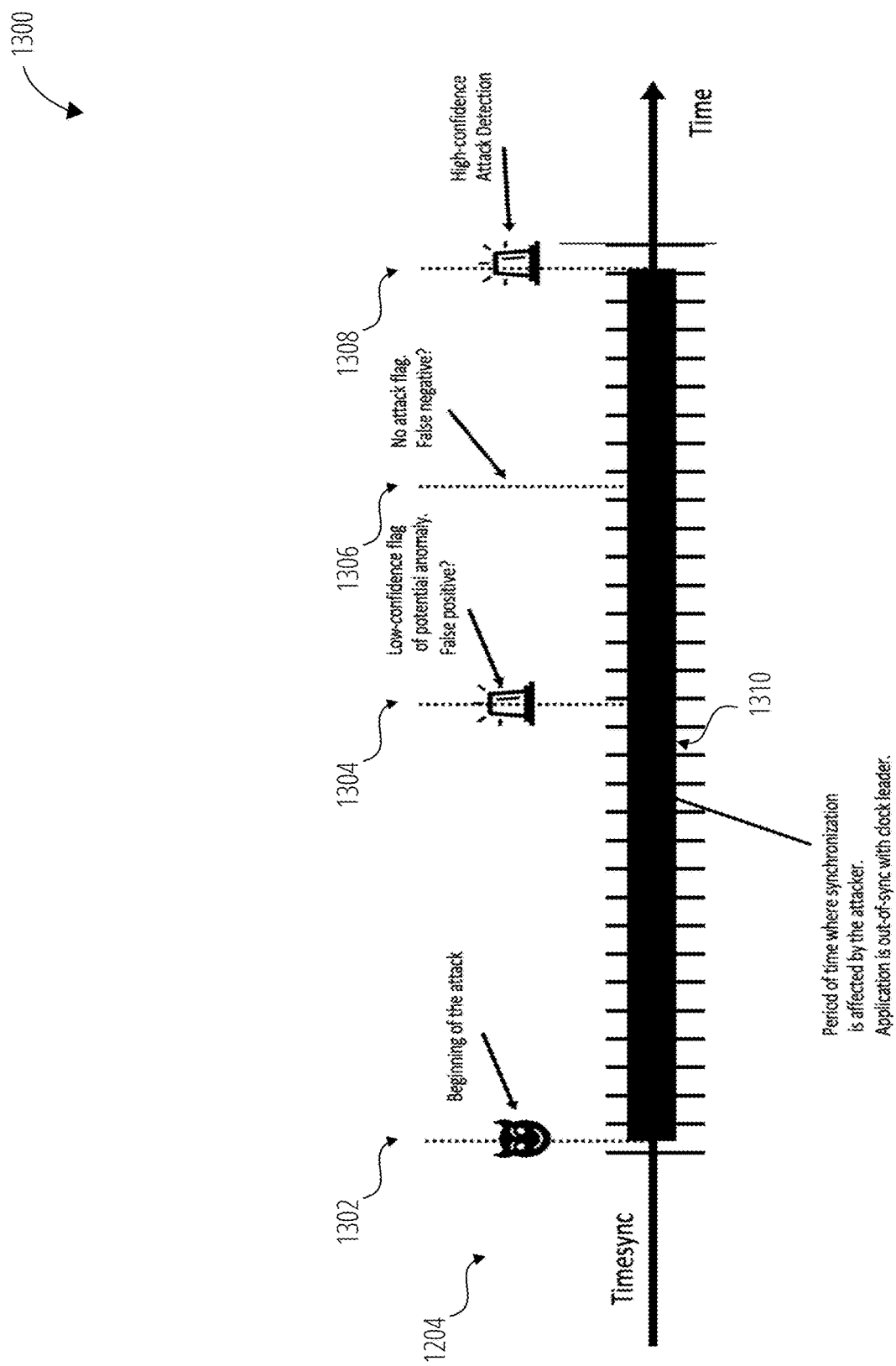
FIG. 13 illustrates an operating environment 1300 in accordance with one embodiment.

FIG. 13 illustrates an operating environment 1300 suitable for TSN nodes 104, clock leader node 202, relay nodes 204a-c, clock follower node 206, relay node 302, system 600, system 700, system 800, or apparatus 500. The operating environment 1300 provides an example of attack detection.

As previously described, the messages 112 can comprise a number of different types of messages communicating time information for a TSN node 104, such as synchronization (sync) messages, follow up (FollowUp) messages, propagation delay (pDelay) messages, and so forth (collectively referred to as "TimeSync" messages). The term "TimeSync" message as used herein may refer to sync messages, follow up messages, both Sync/FollowUp messages, pDelay messages, or some combination thereof. Although embodiments use the collective term "TimeSync" message, it may be appreciated that embodiments are not limited to these particular types of messages 112.

The operating environment 1300 depicts a beginning of an attack at time interval 1302 of timeline 1204. Assume the IDS 110 monitors messages 112 received by a clock follower TSN node 104b and detects preliminary indicia of the attack at time interval 1304. The indicia may comprise a low-confidence flag of a potential anomaly. However, the IDS 110 may not have sufficient information at time interval 1304 to determine whether there is an actual attack or whether the preliminary indicia is merely a false positive. The IDS 110 continues to monitor the messages 112 received by the TSN node 104b, and at time interval 1306, the IDS 110 determines there is no cause to issue an alert 614. However, the IDS 110 may not have sufficient information at time interval 1306 to determine whether there is an actual attack or whether the analysis and indicia collected thus far is really a false negative. In other words, the IDS 110 has still not collected enough evidence to issue the alert 614. At time interval 1308, the IDS has collected enough evidence to determine with a high-level of confidence that the TSN node 104b is under attack, issues the alert 614 and takes corrective actions. The time period between the onset of the attack at time interval 1302 and detection of the attack at time interval 1308 is an attack interval 1310. The attack interval 1310 is a period of time when synchronization is affected by the attacker, and a time sensitive application 404 consuming time from a clock 108b of the TSN node 104b is out-of-sync with the clock 108a of the clock leader TSN node 104a, which maintains a network time for the time sensitive network 102.

Figure 14:
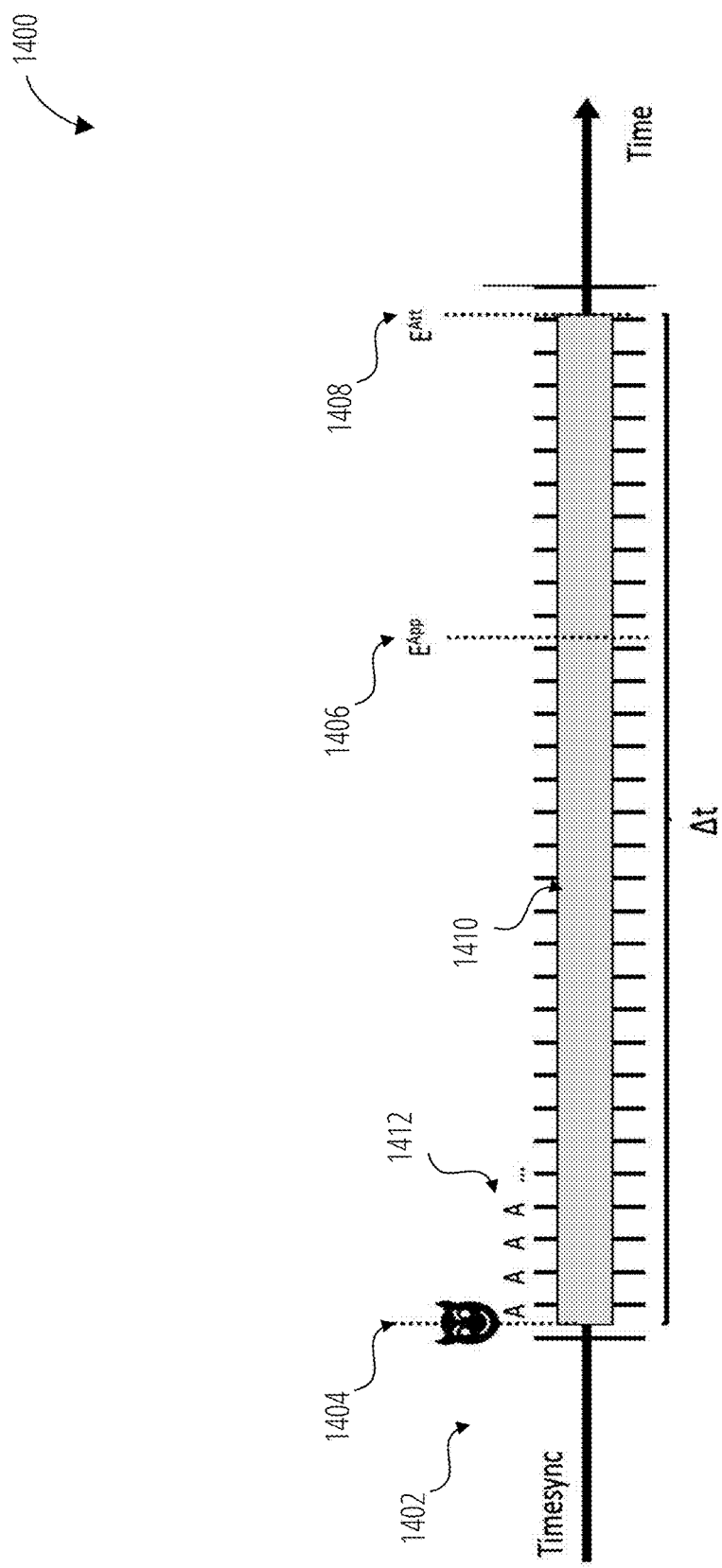
FIG. 14 illustrates an operating environment 1400 in accordance with one embodiment.

FIG. 14 illustrates an operating environment 1400 suitable for TSN nodes 104, clock leader node 202, relay nodes 204a-c, clock follower node 206, relay node 302, system 600, system 700, system 800, or apparatus 500. The operating environment 1400 provides an example of accumulation of time error due to a security attack. The operating environment 1400 depicts a timeline 1402 of messages 112 received by the TSN node 104b. Assume an attack starts at time interval 1404. Further assume a maximum amount of error tolerated by a time sensitive application 404 ($E^{App}$) occurs at time interval 1406, and a total amount of cumulative error due to the attack at a certain point in time ($E^{Att}$) occurs at time interval 1408. The attack interval 1410 is a time period between the time interval 1404 when the attack begins and the time interval 1408 that is the maximum amount of tolerable error. The time sensitive application 404 is impacted if $E^{Att}$ surpasses $E^{App}$, where $E^{Att}=A\times Fs\times \Delta t$.

The operation operating environment 1400 also depicts an amplitude of attack (A) as indicated at various time intervals 1412 after the time interval 1404. Although the amplitude of attack (A) is represented as a fixed bias per message, an attacker can arbitrarily affect any message with any amount of bias. Also, the attacker can choose to impact only selected messages 112 rather than all messages 112. Notice, however, that it is not the best interest of the attacker to impact only selected messages 112, since the receiver of the messages 112 may choose not to consume them all. This it imposes a challenge to the attacker to guess which message 112 will be consumed. An easier way for an attacker to guarantee that the application 404 will consume its messages 112 is to impact all of them. Nonetheless, what matters is the total accumulation of time error despite a given attack delivery vector.

Figure 15:
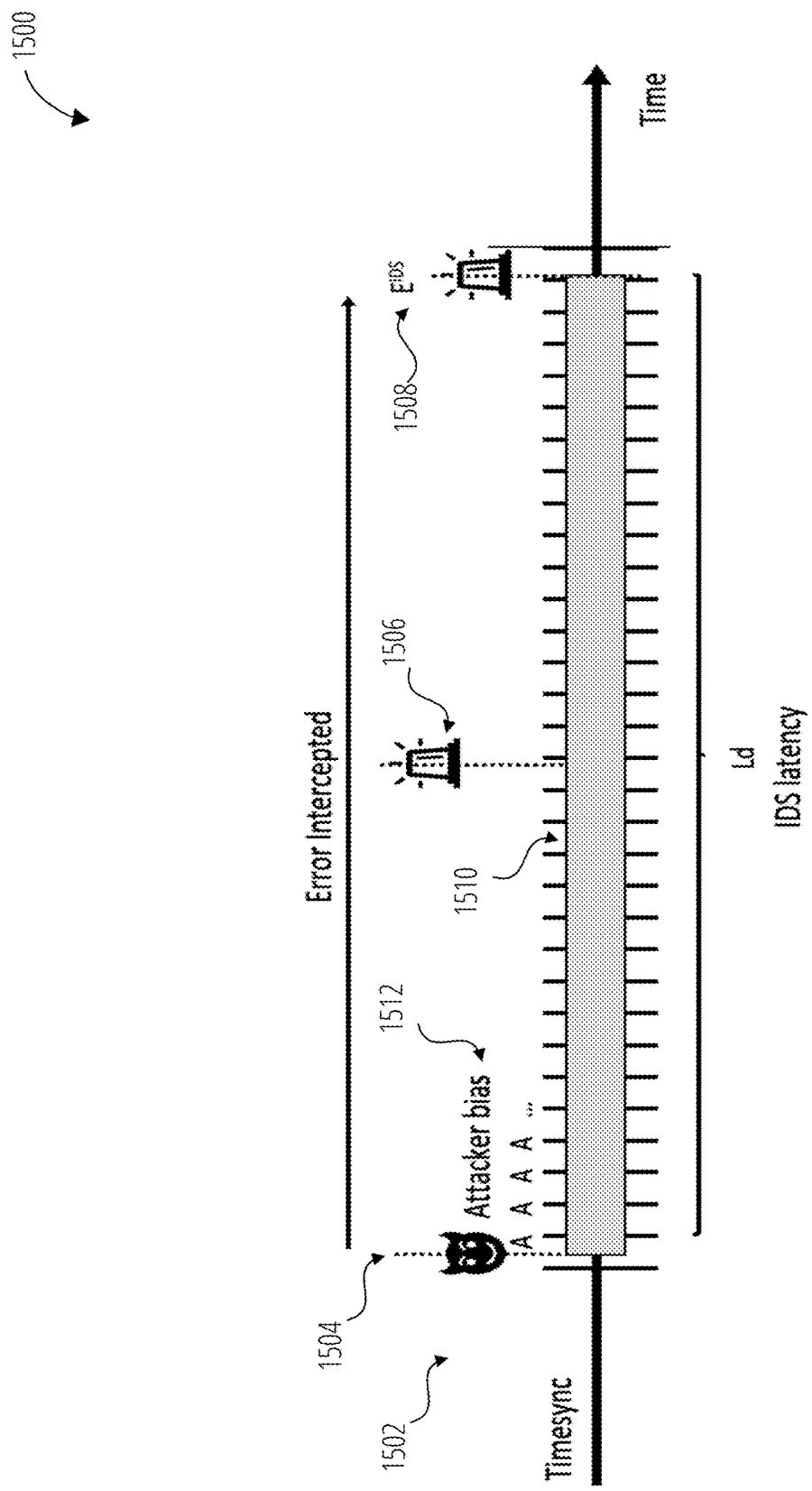
FIG. 15 illustrates an operating environment 1500 in accordance with one embodiment.

FIG. 15 illustrates an operating environment 1500 suitable for TSN nodes 104, clock leader node 202, relay nodes 204a-c, clock follower node 206, relay node 302, system 600, system 700, system 800, or apparatus 500. The operating environment 1500 depicts an example of IDS performance measurements.

It is worthy to note that the IDS 110 treats Origin Time (e.g., from synchronization messages or FollowUp messages) and link delay messages (e.g., pDelayReq/pDelayResp) together as messages 112.

The IDS 110 monitors various types of time information carried by messages 112, such as an Origin Time, a Residence Time and time carried by Link Delay messages. The IDS 110 extract timing features and makes a decision on whether an attack is ongoing or not. The IDS 110 analyzes extracted time features based on regression models that can output a residual that serves as an estimate on the amount of error accumulated due to an attack. The IDS 110 must consume a certain number of messages to be able to flag an attack given a defined attack threshold. The detection latency (Ld) is also dependent on a frequency of the messages 112, such as synchronization messages and link delay messages, among other types of messages. The IDS 110 must wait for new messages 112 to arrive in order to extract more time features.

The operating environment 1500 depicts an example of an amount of accumulated error for IDS detection. In a timeline 1502, assume an attacker begins an attack at time inter time interval 1504 using an amplitude of attack (A) at various time intervals 1512. Further assume the IDS 110 receives preliminary indicia of the attack at time interval 1506 and confirmation of the attack at time interval 1508. A time period for errors to be accumulated or intercepted by the IDS 110 in order to flag the attack at time interval 1508 ($E^{IDS}$) is a detection latency (Ld) for the IDS 110. The detection latency (Ld) for the IDS 110 should not violate a maximum tolerable error the application 404, where $E^{IDS}=A\times Fs\times Ld$.

Figure 16:
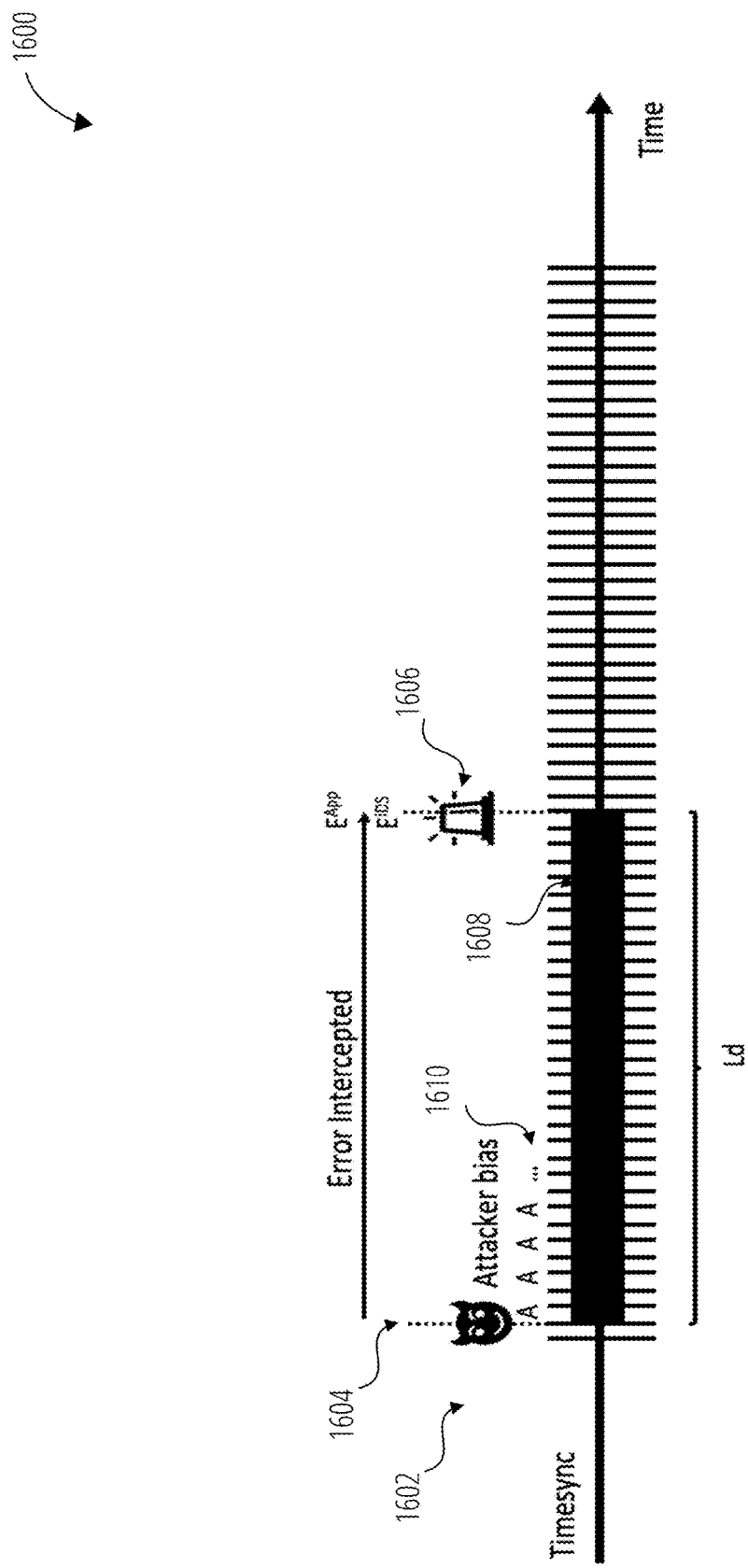
FIG. 16 illustrates an operating environment 1600 in accordance with one embodiment.

FIG. 16 illustrates an operating environment 1600 suitable for TSN nodes 104, clock leader node 202, relay nodes 204a-c, clock follower node 206, relay node 302, system 600, system 700, system 800, or apparatus 500. As previously discussed, the third parameter 712 can be implemented as a static parameter 708. When implemented as a static parameter 708, the various TSN nodes 104 of the time sensitive network 102 can be designed or initialized using the static parameter 708 taking various security requirements into account. This provides an advantage of obviating a need to dynamically change the third parameter 712 during run-time operations. However, higher bandwidth requirements (more messages 112) may be needed for the time sensitive network 102 during normal operations. Conversely, the various TSN nodes 104 and/or IDS 110 monitoring the various TSN nodes 104 of the time sensitive network 102 may request an increase in message frequency on demand. This provides an advantage of consuming less bandwidth during normal operations but requiring a potentially faster catch-up frequency during attack intervals.

As previously discussed, time error accumulated by the application 404 should not surpass the detection latency for the IDS 110, where $E^{App} \leq E^{IDS}$. The operating environment 1600 depicts a timeline 1602. Assume an attacker initiates a security attack at time interval 1604, with an amplitude of attack (A) occurring at various time intervals 1610 after the time interval 1604. A detection latency (Ld) represented by a time interval 1608 should comprise a total amount of intercepted or accumulated error from time interval 1604 (attack initiation) to time interval 1606 (attack detection) that meets the condition $E^{App} \leq E^{IDS}$. Therefore, when the third parameter 712 is implemented as a static parameter 708, the defined message frequency Fs should be greater than $E^{App}/(Ld\times A)$.

Figure 17:
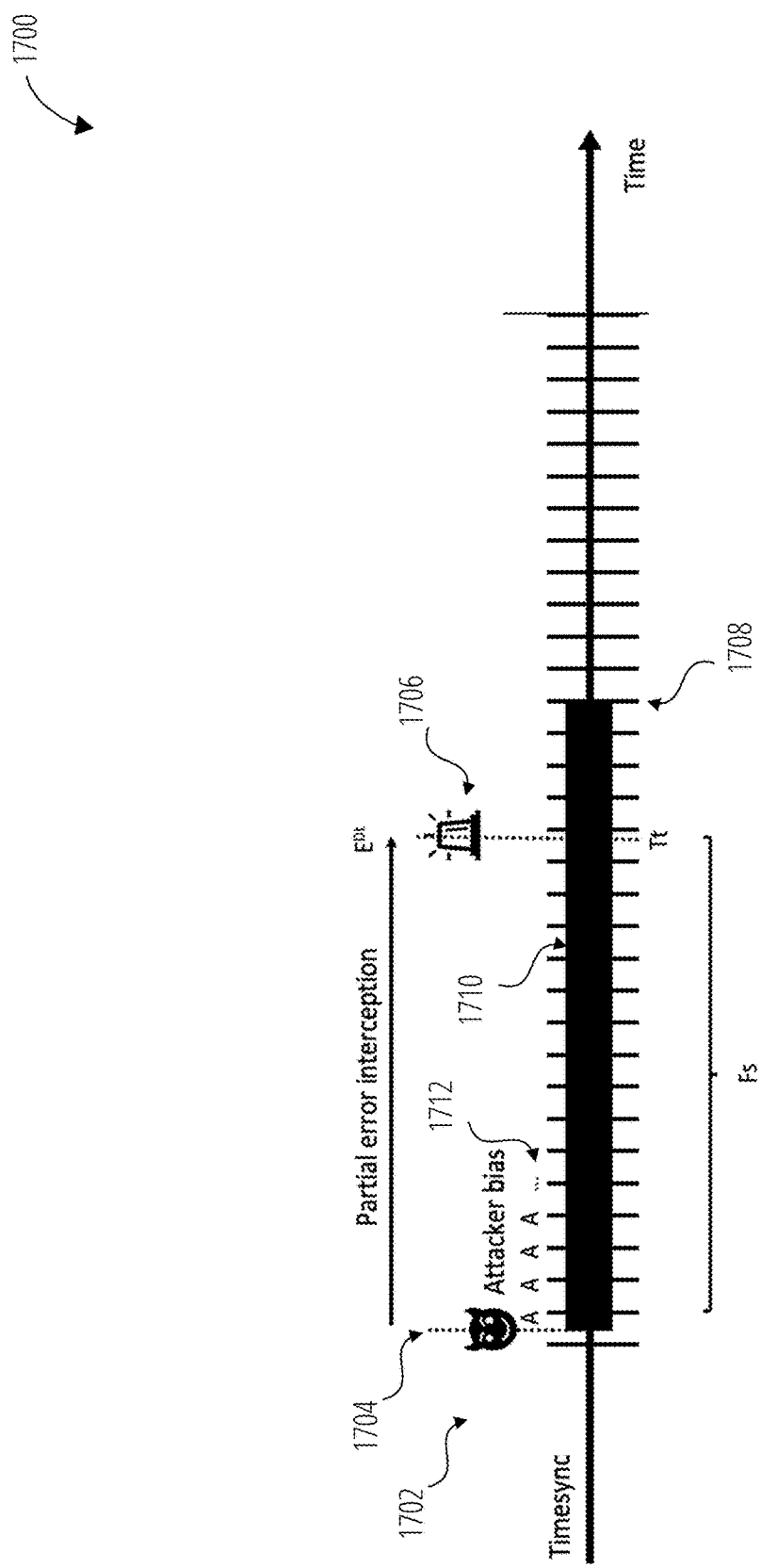
FIG. 17 illustrates an operating environment 1700 in accordance with one embodiment.

FIG. 17 illustrates an operating environment 1700 suitable for TSN nodes 104, clock leader node 202, relay nodes 204a-c, clock follower node 206, relay node 302, system 600, system 700, system 800, or apparatus 500. As previously discussed, the third parameter 712 can be implemented as a dynamic parameter 710. When implemented as a dynamic parameter 710, time error accumulated by the application 404 is calculated in two parts (e.g., $E^{Dt}$ and $E^{IDS}$). The operating environment 1700 illustrates the first part.

The operating environment 1700 depicts a timeline 1702. Assume an attacker initiates a security attack at time interval 1704, with an amplitude of attack (A) occurring at various time intervals 1712 after the time interval 1704. The IDS 110 has a first detection trigger at a given time interval (Tt) represented as time interval 1706. At the first detection trigger, the IDS 110 may calculate a catch-up frequency (Fs')

to more quickly accumulate messages 112 influenced with time bias by the attacker in order to confirm detection of the attack. This may occur even if the first detection trigger is a false positive. An amount of error accumulated at the first detection trigger is $E^{Dt}$. As with the static parameter 708, a detection latency (Ld) represented by a time interval 1710 should comprise a total amount of intercepted or accumulated error from time interval 1704 (attack initiation) to time interval 1708 (attack detection) that meets the condition $E^{App} \leq E^{IDS}$.

Figure 18:
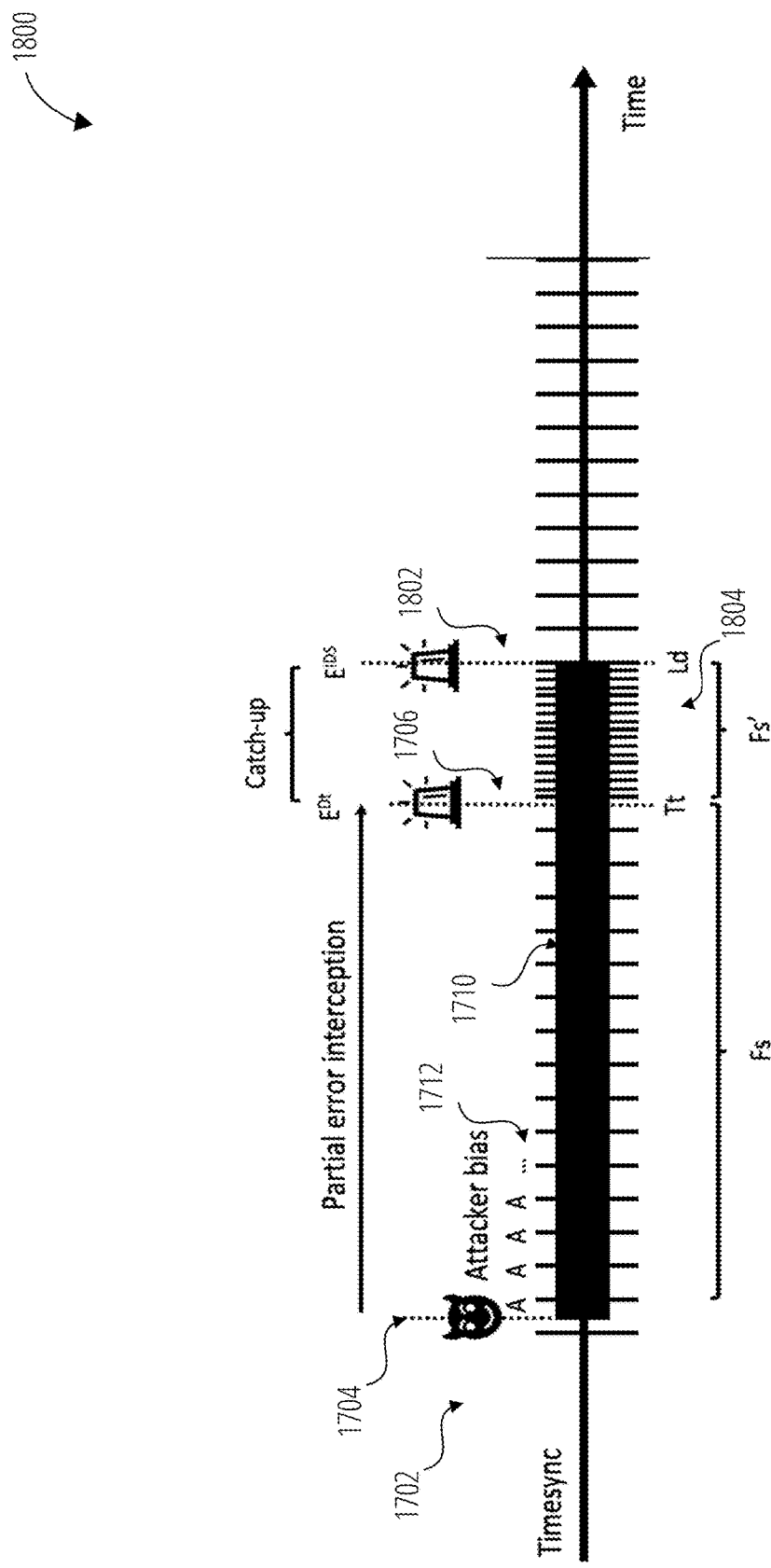
FIG. 18 illustrates an operating environment 1800 in accordance with one embodiment.

FIG. 18 illustrates an operating environment 1800 suitable for TSN nodes 104, clock leader node 202, relay nodes 204a-c, clock follower node 206, relay node 302, system 600, system 700, system 800, or apparatus 500. As previously discussed, the third parameter 712 can be implemented as a dynamic parameter 710. When implemented as a dynamic parameter 710, time error accumulated by the application 404 is calculated in two parts (e.g., $E^{Dt}$ and $E^{IDS}$). The operating environment 1800 illustrates the second part.

The operating environment 1800 is similar to the operating environment 1700. Assume an attacker initiates a security attack at time interval 1704, with an amplitude of attack (A) occurring at various time intervals 1712 after the time interval 1704. The IDS 110 has a first detection trigger at a given time interval (Tt) represented as time interval 1706. At the first detection trigger, the IDS 110 may calculate a catch-up frequency (Fs') to more quickly accumulate messages 112 influenced with time bias by the attacker in order to confirm detection of the attack. For instance, the message frequency manager 610 of the IDS 110 for the TSN 104b (the clock follower) may calculate the catch-up frequency (Fs') and send it as part of the message frequency control information 616 to the TSN node 104a (the clock leader). This may occur even if the first detection trigger is a false positive. An amount of error accumulated at the first detection trigger is $E^{Dt}$. A total amount of error accumulated at a second detection trigger is $E^{IDS}$, which occurs at time interval 1802. A catch-up time interval 1804 is defined as a time period between the time interval 1706 and the time interval 1802. During the catch-up time interval 1804, the TSN node 104b may receive the messages 112 at a defined frequency 620 indicated by the dynamic parameter 710. Note, in this example the catch-up frequency (Fs') used for the messages 112 during the catch-up time interval 1804 after the first detection trigger is greater than the frequency (Fs) for the messages 112 used during partial error interception prior to the first detection trigger.

As previously discussed, calculating a static parameter 708 or a dynamic parameter 710 involves determining an amplitude of attack (A) and a detection latency (Ld) for an IDS 110. The attack amplitude (A) can be estimated from residual signals. For example, a regression-based IDS provides a prediction of system output (e.g., residuals, time offset, etc.). A difference between the prediction and an actual system output characterizes an attacker's influence or bias. The IDS characterization maps an amplitude of attack (A) to detection latency (Ld) and maximum error accumulation ($E^{IDS}$) for higher confidence detection. Therefore, for a particular A, a Ld can be estimated from IDS characterization tables. In cases where there are multiple solutions for Ld, a worst case can be utilized. For example, a same residual signal can be caused by two types of security attacks, such as (1) a rapid and aggressive attack; and (2) a slow and stealthy attack.

A catch-up frequency (Fs') can be set to any value suitable for a time sensitive network 102. In some cases, however, a maximum rate of adjustment may be defined by a TSN protocol. For example, IEEE 802.1AS-2020 states that when a value of syncLocked is FALSE, time-synchronization messages shall be transmitted such that the value of the arithmetic mean of the intervals, in seconds, between message transmissions is within ±30% of $2^{currentLogSyncInterval}$. In addition, a PTP port shall transmit time-synchronization messages such that at least 90% of the inter-message intervals are within ±30% of the value of $2^{currentLogSyncInterval}$. The interval between successive time-synchronization messages should not exceed twice the value of $2^{portDs.logSync_{Interval}}$ in order to prevent causing a syncReceiptTimeout event. The PortSyncSyncSend state machine (see 10.2.12) is consistent with these requirements, i.e., the requirements here and the requirements of the PortSyncSyncSend state machine can be met simultaneously.

In some embodiments, when maintaining compliance with 802.1AS, acceleration of frequency can be done by adjusting the time-sync interval while observing the constraint that 90% of messages are within 30% of the acceptable margin. Every sync cycle shortens the cycle interval, therefore allowing for the acceleration of messages 112 to the rate required by security mechanisms.

In various embodiments, a frequency for the messages 112 may be modified or adjusted in traffic-shaped contexts (e.g., such as in 802.1Qbv) that are used to detect attacks. In other embodiments, besides fixed and dynamic approaches, other strategies for adjusting message frequency for the transmission of the messages 112 are also possible, such as randomized, non-uniformly scheduled, and other transmission techniques.

Figure 19B:
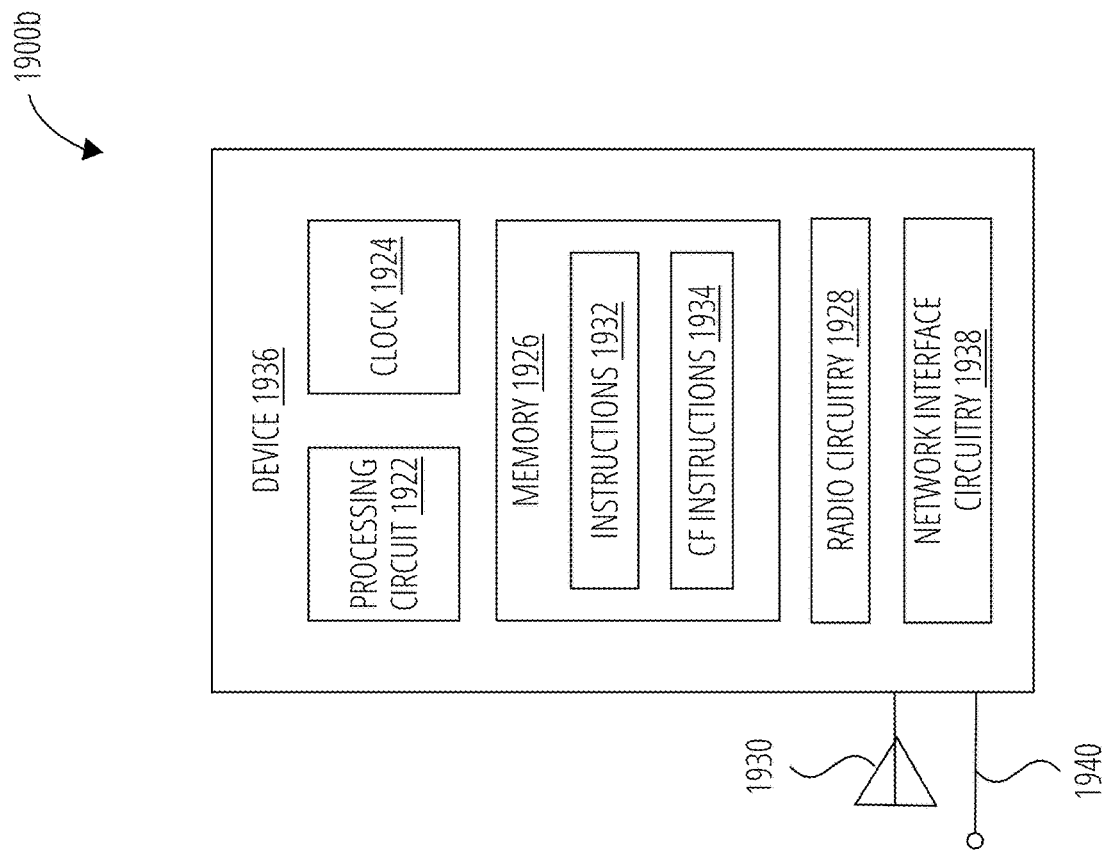
FIG. 19B illustrates an aspect of a clock follower (CF) 1900b in accordance with one embodiment.
Figure 19A:
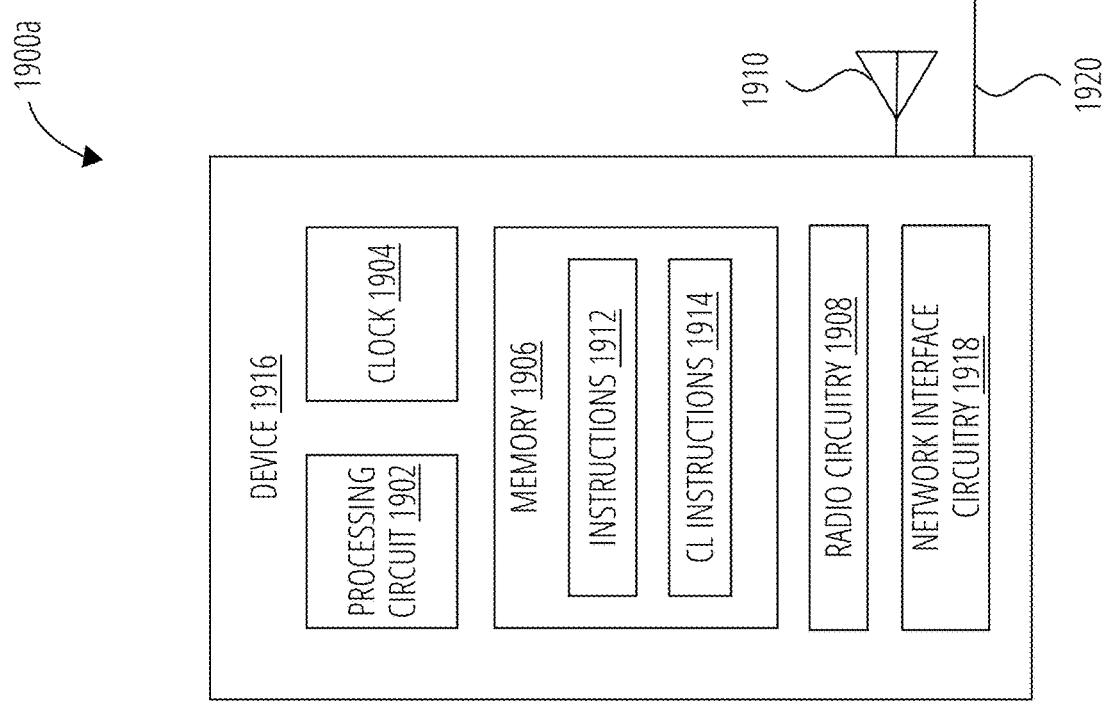
FIG. 19A illustrates an aspect of a clock leader (CL) 1900a in accordance with one embodiment.

FIG. 19A depicts a device 1916. The device 1916 could be a network node or one of the switches in a TSN network (e.g., TSN nodes 104, clock leader node 202, relay nodes 204a-c, clock follower node 206, relay node 302, TSN nodes 104, system 600, system 700, system 800, or apparatus 500). Device 1916 includes a processing circuit 1902, a clock 1904, memory 1906, radio circuitry 1908, an antenna 1910, a network interface circuitry 1918, and a wired connection 1920. Memory 1906 stores instructions 1912 and CL instructions 1914. During operation, processing circuit 1902 can execute instructions 1912 and/or CL instructions 1914 to cause device 1916 to send timing messages as a clock leader or grand clock leader (e.g., from time measurements from a global clock for a TSN network) to other devices in the TSN network. In some examples, processing circuit 1902 can execute instructions 1912 and/or CL instructions 1914 to cause device 1916 to send time synchronization messages, time update messages, and other timing messages defined by various IEEE standards as discussed herein. Furthermore, processing circuit 1902 can execute instructions 1912 to cause device 1916 to send, via radio circuitry 1908 and antenna 1910 or network interface circuitry 1918 timing messages as the CL for a CF in a TSN network.

FIG. 19B depicts a device 1936. The device 1936 could be one of the network nodes or switches in a TSN network (e.g., TSN nodes 104, clock leader node 202, relay nodes 204a-c, clock follower node 206, relay node 302, TSN nodes 104, system 600, system 700, system 800, or apparatus 500). Device 1936 includes a processing circuit 1922, a clock 1924, memory 1926, radio circuitry 1928, an antenna 1930, a network interface circuitry 1938, and a wired connection 1940. Memory 1926 stores instructions 1932 and CF instructions 1934. During operation, processing circuit 1922 can execute instructions 1932 and/or CF instructions 1934 to cause device 1936 to receive timing messages as a clock follower (e.g., from time measurements from a global clock for a TSN network) from other devices in the TSN network, such as the device 1916. In some examples, processing circuit 1922 can execute instructions 1932 and/or CF instructions 1934 to cause device 1936 to receive time synchronization messages, time update messages, and other timing messages defined by various IEEE standards as discussed herein. Furthermore, processing circuit 1922 can execute instructions 1932 and/or CF instructions 1934 to cause device 1936 to receive, via radio circuitry 1928 and antenna 1930 or network interface circuitry 1938 timing messages as the CF for a CL in a TSN network. In addition, processing circuit 1922 can execute instructions 1932 and/or CF instructions 1934 to cause device 1936 to send, via radio circuitry 1928 and antenna 1930 or network interface circuitry 1938 security messages in response to a security attack, such as alert messages, notification messages, network reconfiguration messages, device isolation messages, model update messages, and other messages in a TSN network.

Figure 20:
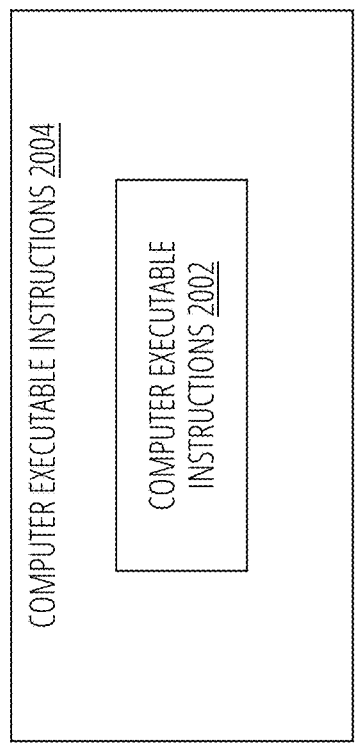
FIG. 20 illustrates an aspect of a computer-readable medium 2000 in accordance with one embodiment.

FIG. 20 illustrates computer-readable storage computer-readable medium 2000. Computer-readable storage computer-readable medium 2000 may comprise any non-transitory computer-readable storage medium or machine-readable storage medium, such as an optical, magnetic or semiconductor storage medium. In various embodiments, computer-readable storage computer-readable medium 2000 may comprise an article of manufacture. In some embodiments, computer-readable storage computer-readable medium 2000 may store computer executable instructions 2002 with which circuitry (e.g., processing circuitry 414, processing circuit 1902, processing circuit 1922, radio circuitry 1908, radio circuitry 1928, network interface circuitry 1918, network interface circuitry 1938, clock manager 106, clock circuitry 412, or the like) can execute. For example, computer executable instructions 2002 can include instructions to implement operations described with respect to logic flows 1900 and 2000. Examples of computer-readable storage computer-readable medium 2000 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2002 may include any suitable type of code, such as source code, compiled code, interpreted code, executable code, static code, dynamic code, object-oriented code, visual code, and the like.

The following aspects and examples pertain to further embodiments, from which numerous permutations and configurations will be apparent.

One example method includes retrieving a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network, retrieving a second parameter for a time sensitive application receiving time information from the synchronized clock of the device, the second parameter to represent a defined amount of time error tolerated by the time sensitive application, and determining a third parameter for the IDS based on the first and second parameters, the third parameter to represent a defined frequency to receive a number of messages with time information in order to detect the security attack on the device within a defined time interval.

The method may also include where the third parameter is a static parameter.

The method may also include where the third parameter is a dynamic parameter.

The method may also include where the device operates in accordance with an Institute of Electrical and Electronics Engineers (IEEE) 802.1AS, IEEE 802.1Qbv, IEEE 802.15.4, or IEEE 1588 standards.

The method may also include where the network time is a precision time protocol (PTP) time.

The method may also include where the messages are synchronization messages or follow up messages for a precision time protocol (PTP).

The method may also include where the clock managed by the clock circuitry is a precision time protocol (PTP) hardware clock (PHC).

The method may also include where the device operates in a clock follower role of the time-synchronized network.

The method may also include where the messages with time information are received from a device operating in a clock leader role of the time-synchronized network.

The method may also include where the third parameter is a static parameter. Other technical features may be readily apparent to one skilled in the art from the following figures, descriptions, and claims.

One example of a computing apparatus includes a processor circuitry. The computing apparatus also includes a memory storing instructions that, when executed by the processor circuitry, cause the processor circuitry to retrieve a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network, retrieve a second parameter for a time sensitive application receiving time information from the synchronized clock of the device, the second parameter to represent a defined amount of time error tolerated by the time sensitive application, and determine a third parameter for the IDS based on the first and second parameters, the third parameter to represent a defined frequency to receive a number of messages with time information in order to detect the security attack on the device within a defined time interval.

The computing apparatus may also include where the third parameter is a static parameter.

The computing apparatus may also include where the third parameter is a dynamic parameter.

The computing apparatus may also include where the device operates in accordance with an Institute of Electrical and Electronics Engineers (IEEE) 802.1AS, IEEE 802.1Qbv, IEEE 802.15.4, or IEEE 1588 standards.

The computing apparatus may also include where the network time is a precision time protocol (PTP) time.

The computing apparatus may also include where the messages are synchronization messages or follow up messages for a precision time protocol (PTP).

The computing apparatus may also include where the clock managed by the clock circuitry is a precision time protocol (PTP) hardware clock (PHC).

The computing apparatus may also include where the device operates in a clock follower role of the time-synchronized network.

The computing apparatus may also include where the messages with time information are received from a device operate in a clock leader role of the time-synchronized network.

The computing apparatus may also include where the third parameter is a static parameter. Other technical features may be readily apparent to one skilled in the art from the following figures, descriptions, and claims.

In one example of a non-transitory computer-readable storage medium, the computer-readable storage medium includes instructions that when executed by a computer, cause the computer to retrieve a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network, retrieve a second parameter for a time sensitive application receiving time information from the synchronized clock of the device, the second parameter to represent a defined amount of time error tolerated by the time sensitive application, and determine a third parameter for the IDS based on the first and second parameters, the third parameter to represent a defined frequency to receive a number of messages with time information in order to detect the security attack on the device within a defined time interval.

The computer-readable storage medium may also include where the third parameter is a static parameter.

The computer-readable storage medium may also include where the third parameter is a dynamic parameter.

The computer-readable storage medium may also include where the device operates in accordance with an Institute of Electrical and Electronics Engineers (IEEE) 802.1AS, IEEE 802.1Qbv, IEEE 802.15.4, or IEEE 1588 standards.

The computer-readable storage medium may also include where the network time is a precision time protocol (PTP) time.

The computer-readable storage medium may also include where the messages are synchronization messages or follow up messages for a precision time protocol (PTP).

The computer-readable storage medium may also include where the clock managed by the clock circuitry is a precision time protocol (PTP) hardware clock (PHC).

The computer-readable storage medium may also include where the device operates in a clock follower role of the time-synchronized network.

The computer-readable storage medium may also include where the messages with time information are received from a device operate in a clock leader role of the time-synchronized network.

The computer-readable storage medium may also include where the third parameter is a static parameter. Other technical features may be readily apparent to one skilled in the art from the following figures, descriptions, and claims.

One example of a computing apparatus includes processor circuitry. The computing apparatus also includes a memory communicatively coupled to the processor circuitry, the memory to store instructions that when executed by the processor circuitry, causes the processor circuitry to execute a time feature decoder to receive as input time information from messages communicated in a time-synchronized network, decode a set of time features from the time information based on a set of time feature parameters, and output the set of time features, execute a detector to receive as input the set of time features from the time feature decoder, detect one or more indications of a security attack based on the set of time features, and output a frequency control signal, and execute a message frequency manager to receive as input the frequency control signal, determine a defined frequency for the messages communicated in the time-synchronized network to assist in detection of the security attack, and output message frequency control information with the defined frequency.

The computing apparatus may also include where the defined parameter is a static parameter.

The computing apparatus may also include where the defined parameter is a dynamic parameter.

The computing apparatus may also include where the device operates in accordance with an Institute of Electrical and Electronics Engineers (IEEE) 802.1AS, IEEE 802.1Qbv, IEEE 802.15.4, or IEEE 1588 standards.

The computing apparatus may also include where the network time is a precision time protocol (PTP) time.

The computing apparatus may also include where the messages are synchronization messages or follow up messages for a precision time protocol (PTP).

The computing apparatus may also include where the clock managed by the clock circuitry is a precision time protocol (PTP) hardware clock (PHC).

The computing apparatus may also include where the device operates in a clock follower role of the time-synchronized network.

The computing apparatus may also include where the messages with time information are received from a device operate in a clock leader role of the time-synchronized network.

The computing apparatus may also include where the defined frequency is a static parameter. Other technical features may be readily apparent to one skilled in the art from the following figures, descriptions, and claims.

The computing apparatus may also include determining an amount of intercepted time error for IDS detection of the security attack based on an amplitude for the security attack multiplied by a candidate frequency of messages received by the IDS multiplied by a latency of detection for the IDS, determining the defined amount of time error tolerated by the time sensitive application based on the amplitude for the security attack multiplied by the candidate frequency of messages received by the IDS multiplied by the latency of detection for the IDS, selecting the candidate frequency as the defined frequency when the candidate frequency is greater than or equal to the defined amount of time error tolerated by the time sensitive application divided by the latency of detection for the IDS multiplied by the amplitude for the security attack, and setting the candidate frequency to the defined frequency for the third parameter.

The computing apparatus may also include initializing a device for operation in a clock leader role for the time-synchronized network to send messages with time information for the time-synchronized network in accordance with the third parameter.

The computing apparatus may also include receiving messages from a device operating in a clock leader role for the time-synchronized network at the defined frequency of the third parameter, the received messages to include time information for the time-synchronized network.

The computing apparatus may also include determining an amount of intercepted time error for IDS detection of the security attack based on an amplitude for the security attack multiplied by a candidate frequency of messages received by the IDS multiplied by a latency of detection for the IDS, determining a partial amount of intercepted time error for a first level of IDS detection of the security attack based on an amplitude for the security attack multiplied by a candidate frequency of messages received by the IDS multiplied by a first defined time interval, determining a catch-up amount of intercepted time error that is less than or equal to the amplitude for the security attack multiplied by a catch-up frequency of messages received by the IDS multiplied by the latency of detection for the IDS minus the first defined time interval, selecting the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval, and setting the catch-up frequency to the defined frequency for the third parameter.

The computing apparatus may also include sending a request message to a device operating in a clock leader role for the time-synchronized network, the request message to request the device operating in the clock leader role to send messages with time information for the time-synchronized network in accordance with the third parameter.

The computing apparatus may also include receiving messages from a device operating in a clock leader role for the time-synchronized network at the defined frequency of the third parameter, the received messages to include time information for the time-synchronized network.

The computing apparatus may also include modifying the third parameter based on modifications to the first parameter or the second parameter, and sending a request message to a device operating in a clock leader role for the time-synchronized network, the request message to request the device operating in the clock leader role to send messages with time information for the time-synchronized network in accordance with the modified third parameter.

The computing apparatus may also include the processor circuitry to determine an amount of intercepted time error for IDS detection of the security attack based on an amplitude for the security attack multiplied by a candidate frequency of messages received by the IDS multiplied by a latency of detection for the IDS, determine the defined amount of time error tolerated by the time sensitive application based on the amplitude for the security attack multiplied by the candidate frequency of messages received by the IDS multiplied by the latency of detection for the IDS, select the candidate frequency as the defined frequency when the candidate frequency is greater than or equal to the defined amount of time error tolerated by the time sensitive application divided by the latency of detection for the IDS multiplied by the amplitude for the security attack, and set the candidate frequency to the defined frequency for the third parameter.

The computing apparatus may also include the processor circuitry to initialize a device for operation in a clock leader role for the time-synchronized network to send messages with time information for the time-synchronized network in accordance with the third parameter.

The computing apparatus may also include the processor circuitry to receive messages from a device operating in a clock leader role for the time-synchronized network at the defined frequency of the third parameter, the received messages to include time information for the time-synchronized network.

The computing apparatus may also include the processor circuitry to determine an amount of intercepted time error for IDS detection of the security attack based on an amplitude for the security attack multiplied by a candidate frequency of messages received by the IDS multiplied by a latency of detection for the IDS, determine a partial amount of intercepted time error for a first level of IDS detection of the security attack based on an amplitude for the security attack multiplied by a candidate frequency of messages received by the IDS multiplied by a first defined time interval, determine a catch-up amount of intercepted time error that is less than or equal to the amplitude for the security attack multiplied by a catch-up frequency of messages received by the IDS multiplied by the latency of detection for the IDS minus the first defined time interval, select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval, and set the catch-up frequency to the defined frequency for the third parameter.

The computing apparatus may also include the processor circuitry to send a request message to a device operating in a clock leader role for the time-synchronized network, the request message to request the device operating in the clock leader role to send messages with time information for the time-synchronized network in accordance with the third parameter.

The computing apparatus may also include the processor circuitry to receive messages from a device operating in a clock leader role for the time-synchronized network at the defined frequency of the third parameter, the received messages to include time information for the time-synchronized network.

The computing apparatus may also include the processor circuitry to modify the third parameter based on modifications to the first parameter or the second parameter, and send a request message to a device operating in a clock leader role for the time-synchronized network, the request message to request the device operating in the clock leader role to send messages with time information for the time-synchronized network in accordance with the modified third parameter.

The computer-readable storage medium may also include determine an amount of intercepted time error for IDS detection of the security attack based on an amplitude for the security attack multiplied by a candidate frequency of messages received by the IDS multiplied by a latency of detection for the IDS, determine the defined amount of time error tolerated by the time sensitive application based on the amplitude for the security attack multiplied by the candidate frequency of messages received by the IDS multiplied by the latency of detection for the IDS, select the candidate frequency as the defined frequency when the candidate frequency is greater than or equal to the defined amount of time error tolerated by the time sensitive application divided by the latency of detection for the IDS multiplied by the amplitude for the security attack, and set the candidate frequency to the defined frequency for the third parameter.

The computer-readable storage medium may also include initialize a device for operation in a clock leader role for the time-synchronized network to send messages with time information for the time-synchronized network in accordance with the third parameter.

The computer-readable storage medium may also include receive messages from a device operating in a clock leader role for the time-synchronized network at the defined frequency of the third parameter, the received messages to include time information for the time-synchronized network.

The computer-readable storage medium may also include determine an amount of intercepted time error for IDS detection of the security attack based on an amplitude for the security attack multiplied by a candidate frequency of messages received by the IDS multiplied by a latency of detection for the IDS, determine a partial amount of intercepted time error for a first level of IDS detection of the security attack based on an amplitude for the security attack multiplied by a candidate frequency of messages received by the IDS multiplied by a first defined time interval, determine a catch-up amount of intercepted time error that is less than or equal to the amplitude for the security attack multiplied by a catch-up frequency of messages received by the IDS multiplied by the latency of detection for the IDS minus the first defined time interval, select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval, and set the catch-up frequency to the defined frequency for the third parameter.

The computer-readable storage medium may also include send a request message to a device operating in a clock leader role for the time-synchronized network, the request message to request the device operating in the clock leader role to send messages with time information for the time-synchronized network in accordance with the third parameter.

The computer-readable storage medium may also include receive messages from a device operating in a clock leader role for the time-synchronized network at the defined frequency of the third parameter, the received messages to include time information for the time-synchronized network.

The computer-readable storage medium may also include modify the third parameter based on modifications to the first parameter or the second parameter, and send a request message to a device operating in a clock leader role for the time-synchronized network, the request message to request the device operating in the clock leader role to send messages with time information for the time-synchronized network in accordance with the modified third parameter.

The computing apparatus may also include the processor circuitry to determine an amount of intercepted time error for IDS detection of the security attack based on an amplitude for the security attack multiplied by a candidate frequency of messages received by the IDS multiplied by a latency of detection for the IDS, determine the defined amount of time error tolerated by the time sensitive application based on the amplitude for the security attack multiplied by the candidate frequency of messages received by the IDS multiplied by the latency of detection for the IDS, select the candidate frequency as the defined frequency when the candidate frequency is greater than or equal to the defined amount of time error tolerated by the time sensitive application divided by the latency of detection for the IDS multiplied by the amplitude for the security attack, and set the candidate frequency to the defined frequency.

The computing apparatus may also include the processor circuitry to initialize a device for operation in a clock leader role for the time-synchronized network to send messages with time information for the time-synchronized network in accordance with the defined frequency.

The computing apparatus may also include the processor circuitry to receive messages from a device operating in a clock leader role for the time-synchronized network at the defined frequency, the received messages to include time information for the time-synchronized network.

The computing apparatus may also include the processor circuitry to determine an amount of intercepted time error for IDS detection of the security attack based on an amplitude for the security attack multiplied by a candidate frequency of messages received by the IDS multiplied by a latency of detection for the IDS, determine a partial amount of intercepted time error for a first level of IDS detection of the security attack based on an amplitude for the security attack multiplied by a candidate frequency of messages received by the IDS multiplied by a first defined time interval, determine a catch-up amount of intercepted time error that is less than or equal to the amplitude for the security attack multiplied by a catch-up frequency of messages received by the IDS multiplied by the latency of detection for the IDS minus the first defined time interval, select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval, and set the catch-up frequency to the defined frequency.

The computing apparatus may also include the processor circuitry to send a request message to a device operating in a clock leader role for the time-synchronized network, the request message to request the device operating in the clock leader role to send messages with time information for the time-synchronized network in accordance with the defined frequency.

The computing apparatus may also include the processor circuitry to receive messages from a device operating in a clock leader role for the time-synchronized network at the defined frequency, the received messages to include time information for the time-synchronized network.

The computing apparatus may also include the processor circuitry to modify the defined frequency based on modifications to the time feature parameters, and send a request message to a device operating in a clock leader role for the time-synchronized network, the request message to request the device operating in the clock leader role to send messages with time information for the time-synchronized network in accordance with the modified defined frequency.

It may be appreciated that some or all of the computing apparatus claims may be implemented as means plus function claims. Other technical features may be readily apparent to one skilled in the art from the following figures, descriptions, and claims.

What is claimed is:
1. A method, comprising:
retrieving a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network;
retrieving a second parameter for a time sensitive application receiving time information from the synchronized clock of the device, the second parameter to represent a defined amount of time error tolerated by the time sensitive application;

determining a third parameter for the IDS based on the first and second parameters, the third parameter to represent a defined frequency to receive a number of messages with time information in order to detect the security attack on the device within a defined time interval; and sending message frequency control information with the third parameter from the IDS.

2. The method of claim 1, wherein the third parameter is a static parameter.

3. The method of claim 2, comprising:

determining an amount of intercepted time error for IDS detection of the security attack based on an amplitude for the security attack multiplied by a candidate frequency of messages received by the IDS multiplied by a latency of detection for the IDS;

determining the defined amount of time error tolerated by the time sensitive application based on the amplitude for the security attack multiplied by the candidate frequency of messages received by the IDS multiplied by the latency of detection for the IDS;

selecting the candidate frequency as the defined frequency when the candidate frequency is greater than or equal to the defined amount of time error tolerated by the time sensitive application divided by the latency of detection for the IDS multiplied by the amplitude for the security attack; and setting the candidate frequency to the defined frequency for the third parameter.

4. The method of claim 2, comprising initializing a device for operation in a clock leader role for the time-synchronized network to send messages with time information for the time-synchronized network in accordance with the third parameter.

5. The method of claim 2, comprising receiving messages from a device operating in a clock leader role for the time-synchronized network at the defined frequency of the third parameter, the received messages to include time information for the time-synchronized network.

6. The method of claim 1, wherein the third parameter is a dynamic parameter.

7. The method of claim 6, comprising:

determining an amount of intercepted time error for IDS detection of the security attack based on an amplitude for the security attack multiplied by a candidate frequency of messages received by the IDS multiplied by a latency of detection for the IDS;

determining a partial amount of intercepted time error for a first level of IDS detection of the security attack based on an amplitude for the security attack multiplied by a candidate frequency of messages received by the IDS multiplied by a first defined time interval;

determining a catch-up amount of intercepted time error that is less than or equal to the amplitude for the security attack multiplied by a catch-up frequency of messages received by the IDS multiplied by the latency of detection for the IDS minus the first defined time interval;

selecting the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval; and setting the catch-up frequency to the defined frequency for the third parameter.

8. The method of claim 6, comprising sending a request message to a device operating in a clock leader role for the time-synchronized network, the request message to request the device operating in the clock leader role to send messages with time information for the time-synchronized network in accordance with the third parameter.

9. A computing apparatus, comprising:

a processor circuitry; and a memory storing instructions that, when executed by the processor circuitry, cause the processor circuitry to:

retrieve a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network;

retrieve a second parameter for a time sensitive application receiving time information from the synchronized clock of the device, the second parameter to represent a defined amount of time error tolerated by the time sensitive application;

determine a third parameter for the IDS based on the first and second parameters, the third parameter to represent a defined frequency to receive a number of messages with time information in order to detect the security attack on the device within a defined time interval; and send message frequency control information with the third parameter from the IDS.

10. The computing apparatus of claim 9, wherein the third parameter is a static parameter.

11. The computing apparatus of claim 10, the processor circuitry to:

determine an amount of intercepted time error for IDS detection of the security attack based on an amplitude for the security attack multiplied by a candidate frequency of messages received by the IDS multiplied by a latency of detection for the IDS;

determine the defined amount of time error tolerated by the time sensitive application based on the amplitude for the security attack multiplied by the candidate frequency of messages received by the IDS multiplied by the latency of detection for the IDS;

select the candidate frequency as the defined frequency when the candidate frequency is greater than or equal to the defined amount of time error tolerated by the time sensitive application divided by the latency of detection for the IDS multiplied by the amplitude for the security attack; and set the candidate frequency to the defined frequency for the third parameter.

12. The computing apparatus of claim 10, the processor circuitry to initialize a device for operation in a clock leader role for the time-synchronized network to send messages with time information for the time-synchronized network in accordance with the third parameter.

13. The computing apparatus of claim 10, the processor circuitry to receive messages from a device operating in a clock leader role for the time-synchronized network at the defined frequency of the third parameter, the received messages to include time information for the time-synchronized network.

14. The computing apparatus of claim 9, wherein the third parameter is a dynamic parameter.

15. The computing apparatus of claim 14, the processor circuitry to:
- determine an amount of intercepted time error for IDS detection of the security attack based on an amplitude for the security attack multiplied by a candidate frequency of messages received by the IDS multiplied by a latency of detection for the IDS;
- determine a partial amount of intercepted time error for a first level of IDS detection of the security attack based on an amplitude for the security attack multiplied by a candidate frequency of messages received by the IDS multiplied by a first defined time interval;
- determine a catch-up amount of intercepted time error that is less than or equal to the amplitude for the security attack multiplied by a catch-up frequency of messages received by the IDS multiplied by the latency of detection for the IDS minus the first defined time interval;
- select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval; and
- set the catch-up frequency to the defined frequency for the third parameter.

16. A non-transitory computer-readable storage medium, the computer-readable storage medium including instructions that when executed by a computer, cause the computer to:
- retrieve a first parameter for an intrusion detection system (IDS) to monitor a device for a time-synchronized network, the first parameter to represent a number of messages the IDS needs to analyze in order to detect a security attack on the device, the messages to comprise time information to synchronize a clock for the device to a network time for the time-synchronized network;
- retrieve a second parameter for a time sensitive application receiving time information from the synchronized clock of the device, the second parameter to represent a defined amount of time error tolerated by the time sensitive application;
- determine a third parameter for the IDS based on the first and second parameters, the third parameter to represent a defined frequency to receive a number of messages with time information in order to detect the security attack on the device within a defined time interval; and
- send message frequency control information with the third parameter from the IDS.

17. The computer-readable storage medium of claim 16, wherein the third parameter is a static parameter.

18. The computer-readable storage medium of claim 17, comprising:
- determine an amount of intercepted time error for IDS detection of the security attack based on an amplitude for the security attack multiplied by a candidate frequency of messages received by the IDS multiplied by a latency of detection for the IDS;
- determine the defined amount of time error tolerated by the time sensitive application based on the amplitude for the security attack multiplied by the candidate frequency of messages received by the IDS multiplied by the latency of detection for the IDS;
- select the candidate frequency as the defined frequency when the candidate frequency is greater than or equal to the defined amount of time error tolerated by the time sensitive application divided by the latency of detection for the IDS multiplied by the amplitude for the security attack; and
- set the candidate frequency to the defined frequency for the third parameter.

19. The computer-readable storage medium of claim 16, wherein the third parameter is a dynamic parameter.

20. The computer-readable storage medium of claim 19, comprising:
- determine an amount of intercepted time error for IDS detection of the security attack based on an amplitude for the security attack multiplied by a candidate frequency of messages received by the IDS multiplied by a latency of detection for the IDS;
- determine a partial amount of intercepted time error for a first level of IDS detection of the security attack based on an amplitude for the security attack multiplied by a candidate frequency of messages received by the IDS multiplied by a first defined time interval;
- determine a catch-up amount of intercepted time error that is less than or equal to the amplitude for the security attack multiplied by a catch-up frequency of messages received by the IDS multiplied by the latency of detection for the IDS minus the first defined time interval;
- select the catch-up frequency of messages when the catch-up frequency is greater than or equal to the amount of intercepted time error for IDS detection of the security attack minus the partial amount of intercepted time error for the first level of IDS detection of the security attack divided by the amplitude for the security attack multiplied by the latency of detection for the IDS minus the first defined time interval; and
- set the catch-up frequency to the defined frequency for the third parameter.

* * * * *